United States Patent
Roumeliotis et al.

(10) Patent No.: US 9,286,332 B1
(45) Date of Patent: Mar. 15, 2016

(54) METHOD AND SYSTEM FOR IDENTIFYING ENTITIES AND OBTAINING FINANCIAL PROFILE DATA FOR THE ENTITIES USING DE-DUPLICATED DATA FROM TWO OR MORE TYPES OF FINANCIAL MANAGEMENT SYSTEMS

(71) Applicant: Intuit Inc., Mountain View, CA (US)

(72) Inventors: George Roumeliotis, Menlo Park, CA (US); Brian A. Wilt, Redwood City, CA (US); Bei Huang, Menlo Park, CA (US)

(73) Assignee: Intuit Inc., Mountain View, CA (US)

( * ) Notice: Subject to any disclaimer, the term of this patent is extended or adjusted under 35 U.S.C. 154(b) by 236 days.

(21) Appl. No.: 14/013,865

(22) Filed: Aug. 29, 2013

(51) Int. Cl.
*G06F 17/30* (2006.01)

(52) U.S. Cl.
CPC ............................. *G06F 17/30303* (2013.01)

(58) Field of Classification Search
CPC .................... G06F 17/30156; G06F 17/30158; G06F 17/30371; G06F 17/30067; G06F 17/30489; G06F 17/30641; G06F 9/52; G06F 3/0608
USPC ......................................................... 707/692
See application file for complete search history.

(56) References Cited

U.S. PATENT DOCUMENTS

| | | | |
|---|---|---|---|
| 4,989,141 A | 1/1991 | Lyons et al. | |
| 5,680,305 A | 10/1997 | Apgar, IV | |
| 5,842,185 A | 11/1998 | Chancey et al. | |
| 5,873,251 A | 2/1999 | Iino | |
| 5,956,691 A | 9/1999 | Powers | |
| 6,021,415 A | 2/2000 | Cannon et al. | |
| 6,032,134 A | 2/2000 | Weissman | |
| 6,430,539 B1 | 8/2002 | Lazarus et al. | |
| 6,542,896 B1 | 4/2003 | Gruenwald | |
| 6,792,422 B1 | 9/2004 | Stride et al. | |
| 7,321,869 B1 | 1/2008 | Phibbs, Jr. | |
| 7,801,987 B2 | 9/2010 | Grell et al. | |
| 7,912,842 B1 * | 3/2011 | Bayliss | ........................ 707/749 |
| 8,175,908 B1 | 5/2012 | Anderson | |
| 8,177,121 B2 | 5/2012 | Zimmerman et al. | |

(Continued)

OTHER PUBLICATIONS

Sanghvi et al., "Method and System for Detecting Duplicate Financial Accounts," U.S. Appl. No. 13/355,333, filed Jan. 20, 2012.

(Continued)

*Primary Examiner* — Cam-Y Truong
(74) *Attorney, Agent, or Firm* — Hawley Troxell Ennis & Hawley LLP; Philip McKay

(57) ABSTRACT

Financial data is obtained from two or more types of financial management systems and analyzed to obtain potential entities data identifying potential entities and attributes associated with the potential entities. Duplicate potential entity data is then identified and eliminated to generate a master entity list. The financial data is also analyzed to identify potential commercial transaction data and one or more attributes associated with the commercial transaction data, including data indicating commercial transactions and the parties associated with the commercial transactions. The commercial transaction data is then analyzed using the master entity list to match entities listed in the master entity list with the parties associated with the commercial transactions. The matched entities are then substituted for the respectively matched parties associated with the commercial transactions to create a master commercial transaction list. The master entity list and the master commercial transaction list data is then stored.

19 Claims, 8 Drawing Sheets

(56) References Cited

U.S. PATENT DOCUMENTS

| | | |
|---|---|---|
| 8,243,074 B1 | 8/2012 | Kilat et al. |
| 8,250,008 B1 | 8/2012 | Cao et al. |
| 8,346,661 B2 | 1/2013 | Allison et al. |
| 8,554,592 B1 | 10/2013 | Merz |
| 8,612,262 B1 | 12/2013 | Condon et al. |
| 8,732,055 B1 | 5/2014 | Dinamani et al. |
| 2002/0073114 A1 | 6/2002 | Nicastro et al. |
| 2002/0169658 A1 | 11/2002 | Adler |
| 2003/0065677 A1 | 4/2003 | Culp et al. |
| 2003/0167253 A1 | 9/2003 | Meinig |
| 2004/0015381 A1 | 1/2004 | Johnson et al. |
| 2004/0093281 A1* | 5/2004 | Silverstein et al. .............. 705/26 |
| 2004/0122905 A1 | 6/2004 | Smith et al. |
| 2004/0138932 A1 | 7/2004 | Johnson et al. |
| 2004/0138934 A1 | 7/2004 | Johnson et al. |
| 2004/0138935 A1 | 7/2004 | Johnson et al. |
| 2004/0138936 A1 | 7/2004 | Johnson et al. |
| 2004/0236734 A1 | 11/2004 | Yip et al. |
| 2004/0243489 A1 | 12/2004 | Mitchell et al. |
| 2005/0013428 A1 | 1/2005 | Walters, Jr. |
| 2005/0154617 A1 | 7/2005 | Ruggieri et al. |
| 2005/0252963 A1 | 11/2005 | Adams et al. |
| 2005/0257209 A1 | 11/2005 | Adams et al. |
| 2005/0289024 A1 | 12/2005 | Hahn-Carlson et al. |
| 2006/0123461 A1 | 6/2006 | Lunt et al. |
| 2006/0178961 A1 | 8/2006 | Stanley et al. |
| 2007/0022025 A1 | 1/2007 | Litman et al. |
| 2007/0055597 A1 | 3/2007 | Patel et al. |
| 2007/0061187 A1 | 3/2007 | Laskowski-Bender |
| 2007/0150139 A1 | 6/2007 | Hardy |
| 2007/0208503 A1 | 9/2007 | Harnsberger |
| 2007/0239799 A1 | 10/2007 | Modi |
| 2007/0250258 A1 | 10/2007 | Hager |
| 2008/0004924 A1 | 1/2008 | Cao et al. |
| 2008/0147425 A1 | 6/2008 | Durvasula et al. |
| 2009/0043637 A1 | 2/2009 | Eder |
| 2009/0048884 A1 | 2/2009 | Olives et al. |
| 2009/0193046 A1 | 7/2009 | Desai et al. |
| 2009/0234826 A1 | 9/2009 | Bidlack |
| 2009/0282010 A1 | 11/2009 | Vasudevan et al. |
| 2009/0283591 A1 | 11/2009 | Silbernagl |
| 2010/0005048 A1 | 1/2010 | Bodapati et al. |
| 2010/0057742 A1 | 3/2010 | Hardy-McGee |
| 2010/0076812 A1 | 3/2010 | Ghosh et al. |
| 2011/0087575 A1 | 4/2011 | DeBie et al. |
| 2011/0289109 A1 | 11/2011 | Kaoru |
| 2012/0102036 A1 | 4/2012 | Parker et al. |
| 2012/0109734 A1 | 5/2012 | Fordyce et al. |
| 2012/0189186 A1 | 7/2012 | Csulits et al. |
| 2012/0284105 A1 | 11/2012 | Li |
| 2013/0085910 A1 | 4/2013 | Chew |
| 2013/0132410 A1 | 5/2013 | Rineer |
| 2013/0291060 A1* | 10/2013 | Moore .............. G06F 21/6245 726/1 |
| 2013/0297381 A1* | 11/2013 | Akkihal .............. G06Q 10/087 705/7.31 |
| 2013/0339311 A1* | 12/2013 | Ferrari .............. G06Q 30/0627 707/687 |

OTHER PUBLICATIONS

Deng et al., "Financial Account Classification Rule Discovery," U.S. Appl. No. 13/653,178, filed Oct. 16, 2012.

Deng et al., "Method and System for Creating and Updating an Entity Name Alias Table," U.S. Appl. No. 13/666,760, filed Nov. 1, 2012.

Matthews et al., "Method and System for Temporally Tracking and Correlating Internet-Based Marketing Efforts with Customer Actions," U.S. Appl. No. 13/754,130, filed Jan. 30, 2013.

Roumeliotis et al., "Method and System for Identifying Entities and Obtaining Financial Profile Data for the Entities Using Data from Two or More Types of Financial Management Systems," U.S. Appl. No. 13/834,379, filed Mar. 15, 2013.

Roumeliotis et al., "Method and System for Providing Objective and Relevant Business Profile and Ratings Data," U.S. Appl. No. 13/836,015, filed Mar. 15, 2013.

Roumeliotis et al., "Method and System for Providing Objective and Relevant Customer Desirability Data," U.S. Appl. No. 13/839,317, filed Mar. 15, 2013.

Roumeliotis et al., "Method and System for Identifying and Evaluating Existing and Potential Business Relationships," U.S. Appl. No. 13/852,163, filed Mar. 28, 2013.

Sarshar et al., "Method and System for Providing Benchmarking Data to a Business," U.S. Appl. No. 13/852,193, filed Mar. 28, 2013.

Roumeliotis et al., "System and Method for Identifying Commercially Related Entities and Facilitating Coordinated Actions by the Identified Commercially Related Entities," U.S. Appl. No. 13/852,217, filed Mar. 28, 2013.

Roumeliotis et al., "Method and System for Identifying the Effect of Changes in an Business Operational Parameter," U.S. Appl. No. 13/874,086, filed Apr. 30, 2013.

Roumeliotis et al., "Method and System for Generating Predictive Modeling and Recommendation Data for a Business," U.S. Appl. No. 13/874,133, filed Apr. 30, 2013.

Roumeliotis et al., "Method and System for Determining the Effectiveness of Brand Advertising," U.S. Appl. No. 14/014,943, filed Aug. 30, 2013.

Roumeliotis et al., "Method and System for Identifying Financial Entities and De-Duplicating Financial Data," U.S. Appl. No. 14/033,677, filed Sep. 23, 2013.

* cited by examiner

METHOD AND SYSTEM FOR IDENTIFYING ENTITIES AND OBTAINING FINANCIAL PROFILE DATA FOR THE ENTITIES USING DE-DUPLICATED DATA FROM TWO OR MORE TYPES OF FINANCIAL MANAGEMENT SYSTEMS

BACKGROUND

Data management systems, and particularly financial management systems, have become increasing important tools that are used by millions of individuals and businesses throughout the world. Currently, financial management systems include both computing system implemented, i.e., desktop centric, systems and web-based, or on-line, systems. In addition, many financial management systems are directed primarily to processing personal financial data while others are largely directed to processing business or merchant financial data.

Herein, financial management systems directed to different users, such as personal or business users, and/or for performing different functions, such as financial management, financial transaction management, tax preparation, Point Of Sale, etc., are referred to as different "types" of financial management systems.

Examples of currently available types of financial management systems directed to personal financial data include, but are not limited to, computing system implemented and/or on-line personal financial management systems, packages, programs, modules, or applications; computing system implemented and/or on-line personal financial transaction management systems, packages, programs, modules, or applications; computing system implemented and/or on-line personal tax preparation systems, packages, programs, modules, or applications; computing system implemented and/or on-line personal banking systems, packages, programs, modules, or applications; and computing system implemented and/or on-line personal accounting systems, packages, programs, modules, or applications.

Examples of currently available types of financial management systems directed to business financial data include, but are not limited to, computing system implemented and/or on-line business financial management systems, packages, programs, modules, or applications; computing system implemented and/or on-line business financial transaction management systems, packages, programs, modules, or applications; computing system implemented and/or on-line Point Of Sale (POS) systems, packages, programs, modules, or applications; computing system implemented and/or on-line business tax preparation systems, packages, programs, modules, or applications; computing system implemented and/or on-line business banking systems, packages, programs, modules, or applications; computing system implemented and/or on-line invoicing systems, packages, programs, modules, or applications; computing system implemented and/or on-line business accounting systems, packages, programs, modules, or applications; and computing system implemented and/or on-line inventory systems, packages, programs, modules, or applications.

The wide use of financial management systems, along with the variety of financial management system types in use, has two important consequences. First, there is an incredible amount of information that is obtained by, processed by, and potentially available from existing financial management systems, particularly when data from different types of financial management systems is considered in the aggregate. Second, in many cases, the data collected by various types of financial management systems when considered in the aggregate represents most, if not all, financial data and information available regarding the numerous, and ever growing number of, entities using the financial management systems, and the financial connections between those entities.

Despite the fact that different types of financial management systems, when considered in the aggregate, are potential sources of more detailed and complete financial data than has ever been made available before, different types of financial management systems, such as personal financial management systems used by consumers, and business financial management systems used by merchants, currently operate in isolation from each other; even when the different types of financial management systems are offered by the same parent company, and even in the case where the same entity is using the different types of financial management systems. Consequently, currently, there are no methods or systems available for aggregating data from two or more different types of financial management systems, such as personal and business financial management systems, to provide more detailed and complete analysis of the financial profiles and financial connections associated with the entities using the financial management systems.

This is an unfortunate situation since if data from different types of financial management systems were aggregated and correlated, the resulting data source could be accessed and processed in an almost infinite number of ways to provide economic profiling, modeling, and insight that is currently unavailable, and to reveal financial connections between entities that are currently unknown, often even to the entities themselves. In short, if data from different types of financial management systems were readily aggregated and correlated into interconnected entity profiles, human financial activity could be analyzed and modeled in ways currently impossible, and at a level of detail and completeness currently unattainable.

What is needed is a method and system for efficiently and effectively obtaining and aggregating financial data from different types of financial management systems, identifying the entities associated with aggregated financial data, de-duplicating the entities associated with aggregated financial data, identifying commercial transactions in the financial data from different types of financial management systems, correlating the entities associated with aggregated financial data with the commercial transactions, and then storing the aggregated and correlated financial data for access and processing.

SUMMARY

In accordance with one embodiment, a system and method for identifying entities and obtaining financial profile data for the entities using de-duplicated data from two or more types of financial management systems includes obtaining financial data from two or more types of financial management systems. The financial data is then analyzed to obtain potential entities data identifying potential entities and one or more attributes associated with the potential entities.

In accordance with one embodiment, duplicate potential entity data in the potential entities data is identified and eliminated to transform the potential entities data into a master entity list including data indicating the identified entities and their respective attributes.

In one embodiment, the financial data is also analyzed to identify commercial transaction data and one or more attributes associated with the commercial transaction data, including data indicating commercial transactions and the parties associated with the commercial transactions. In one embodiment, the commercial transaction data is then analyzed using the master entity list to match one or more entities listed in the master entity list with one or more parties associated with the commercial transactions of the commercial transaction data. In one embodiment, the matched entities listed in the master entity list are then substituted for the respectively matched parties associated with the commercial transactions in the commercial transaction data to create a master commercial transaction list. In one embodiment, data representing the master entity list and the master commercial transaction list is then stored.

Figure 1:
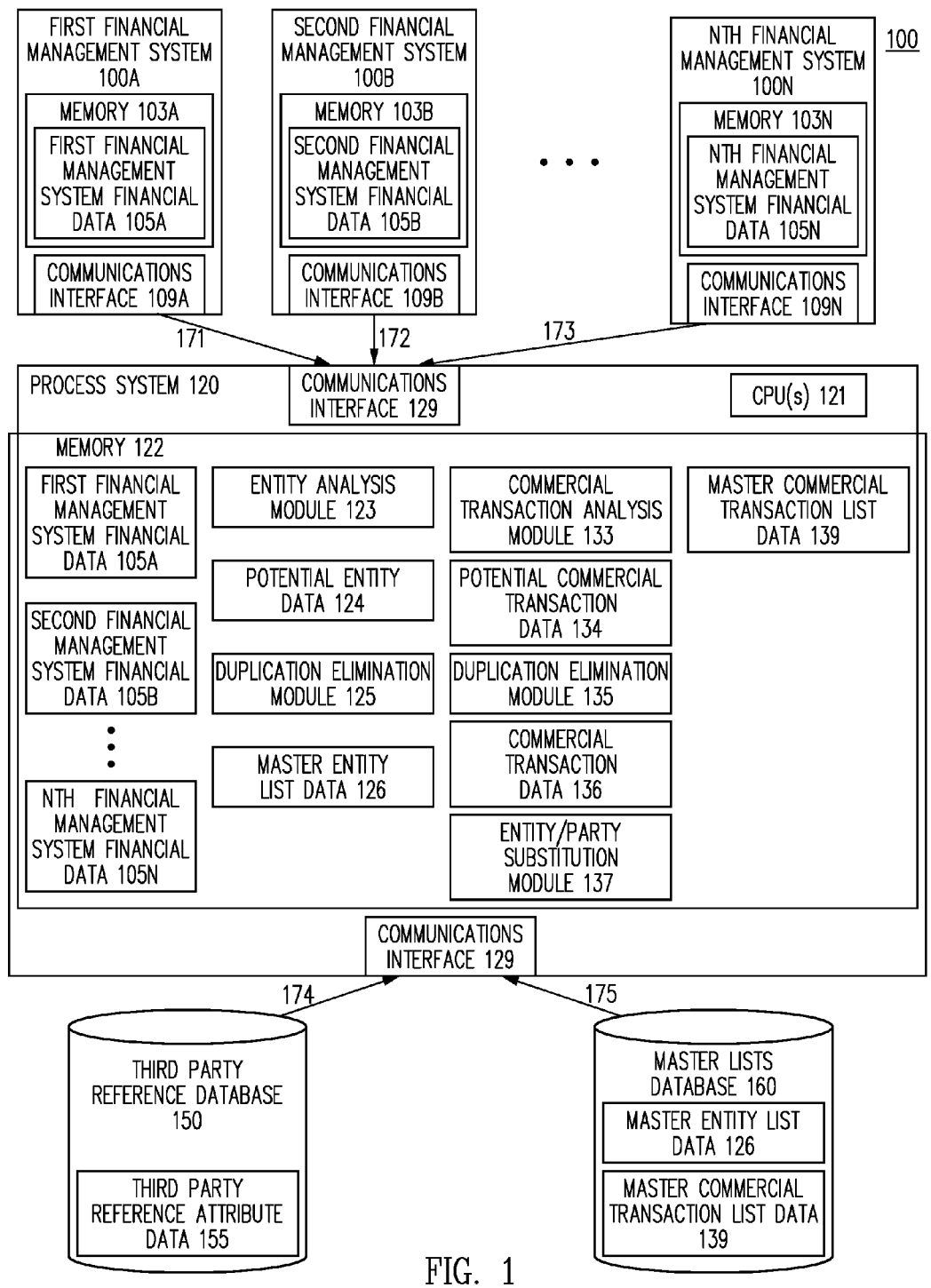
FIG. 1 is a block diagram of an exemplary hardware architecture for implementing one embodiment.

Common reference numerals are used throughout the FIG.s and the detailed description to indicate like elements. One skilled in the art will readily recognize that the above FIG.s are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. Embodiments may be implemented in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

In accordance with one embodiment, a method and system for identifying entities and obtaining financial profile data for the entities using de-duplicated data from two or more types of financial management systems includes a process for identifying entities and obtaining financial profile data for the entities using de-duplicated data from two or more types of financial management systems implemented by one or more processors associated with one or more computing systems.

As used herein, the term "computing system", includes, but is not limited to, a desktop computing system; a portable computing system; a mobile computing system; a laptop computing system; a notebook computing system; a tablet computing system; a workstation; a server computing system; a mobile phone; a smart phone; a wireless telephone; a two-way pager; a Personal Digital Assistant (PDA); a media player, i.e., an MP3 player and/or other music and/or video player; an Internet appliance; or any device that includes components that can execute all, or part, of any one of the processes and/or operations as described herein. In addition, as used herein, the term computing system, can denote, but is not limited to, systems made up of multiple desktop computing systems; portable computing systems; mobile computing systems; laptop computing systems; notebook computing systems; tablet computing systems; workstations; server computing systems; smart phones; wireless telephones; two-way pagers; Personal Digital Assistants (PDAs); media players; Internet appliances; or any devices that can be used to perform the processes and/or operations as described herein.

In one embodiment, one or more computing systems are connected by one or more communications channels, such as, but not limited to: any general network, communications network, or general network/communications network system; a cellular network; a wireless network; a combination of different network types; a public network; a private network; a satellite network; a POTS network; a cable network; or any other network capable of allowing communication between two or more computing systems, as discussed herein, and/or available or known at the time of filing, and/or as developed after the time of filing.

As used herein, the term "network" includes, but is not limited to, any network or network system such as, but not limited to, a peer-to-peer network, a hybrid peer-to-peer network, a Local Area Network (LAN), a Wide Area Network (WAN), a public network, such as the Internet, a private network, a cellular network, a POTS network; any general network, communications network, or general network/communications network system; a wireless network; a wired network; a wireless and wired combination network; a satellite network; a cable network; any combination of different network types; or any other system capable of allowing communication between two or more computing systems, whether available or known at the time of filing or as later developed.

In one embodiment, the system and method for identifying entities and obtaining financial profile data for the entities using de-duplicated data from two or more types of financial management systems includes obtaining financial data from two or more types of financial management systems.

As noted above, herein, financial management systems directed to different users, such as personal or business users, and/or for performing different functions, such as financial management, financial transaction management, tax preparation, Point Of Sale (POS), etc. are referred to as different "types" of financial management systems.

Examples of currently available types of financial management systems directed to personal financial data include, but are not limited to, computing system implemented and/or on-line personal financial management systems, packages, programs, modules, or applications; computing system implemented and/or on-line personal financial transaction management systems, packages, programs, modules, or applications; computing system implemented and/or on-line personal tax preparation systems, packages, programs, modules, or applications; computing system implemented and/or on-line personal banking systems, packages, programs, modules, or applications; and computing system implemented and/or on-line personal accounting systems, packages, programs, modules, or applications.

Examples of currently available types of financial management systems directed to business financial data include, but are not limited to, computing system implemented and/or on-line business financial management systems, packages, programs, modules, or applications; computing system implemented and/or on-line business financial transaction management systems, packages, programs, modules, or applications; computing system implemented and/or on-line Point Of Sale (POS) systems, packages, programs, modules, or applications; computing system implemented and/or on-line business tax preparation systems, packages, programs, modules, or applications; computing system implemented and/or on-line business banking systems, packages, programs, modules, or applications; computing system implemented and/or on-line invoicing systems, packages, programs, modules, or applications; computing system implemented and/or on-line business accounting systems, packages, programs, modules, or applications; and computing system implemented and/or on-line inventory systems, packages, programs, modules, or applications.

In one embodiment, the financial data obtained from two or more types of financial management systems includes, but is not limited to, entity identification and attribute data obtained from registration data provided by users of the financial management systems; entity identification and attribute data obtained from vendor and customer data entered into, or obtained by, the two or more types of financial management systems; transactional data entered onto, or obtained by, the two or more types of financial management systems including payee identification and attribute data, payor identification and attribute data, date and time data, geolocation data, amount data, etc.; and/or any other financial data desired and obtainable from the two or more types of financial management systems.

In one embodiment, the financial data obtained from the two or more types of financial management systems is analyzed to identify data entry fields and the organization scheme used by each of the two or more types of financial management systems. In one embodiment, the data entry fields and the organization schemes used by each of the two or more types of financial management systems are then correlated and/or mapped to identify similar and/or identical data or data types.

In one embodiment, the financial data obtained from two or more types of financial management systems is analyzed to obtain potential entities data identifying potential entities and one or more attributes associated with the potential entities.

Herein, the term "entity" includes, but is not limited to, any person, group of persons, merchant, group of merchants, business, group of businesses, and/or any other party that can be identified from, and/or is associated with, one or more financial management systems.

Examples of attributes associated with the potential entities include, but are not limited to, one or more names associated with an individual entity; one or more names associated with a business entity; one or more addresses associated with an individual entity; one or more addresses associated with a business entity; one or more zip codes, cities, counties, states or countries, associated with an individual entity; one or more zip codes, cities, counties, states or countries, associated with a business entity; one or more geo-locations associated with an individual entity; one or more geo-locations associated with a business entity; one or more phone numbers associated with an individual entity; one or more phone numbers associated with a business entity; one or more E-mail addresses associated with an individual entity; one or more E-mail addresses associated with a business entity; one or more website addresses associated with an individual entity; one or more website addresses associated with a business entity; one or more industries, markets, or areas of endeavor associated with an individual entity; one or more industries, markets, or areas of endeavor associated with a business entity; one or more social media/social network accounts and/or addresses associated with an individual entity; one or more social media/social network accounts and/or addresses associated with a business entity; and/or any other attributes associated with the potential entities desired and/or discernible from the financial data obtained from two or more types of financial management systems.

In one embodiment, the potential entities data, including the potential entity names and potential entity attributes, is arranged in a common format as a list of identified initial potential entities referred to herein as initial potential entities data.

In one embodiment, external reference entities data is then obtained from a third party source. In one embodiment, the external reference entities data is obtained from Dun and Bradstreet®.

In one embodiment, the external reference entities data includes data identifying one or more external reference entities and one or more entity attributes associated with each of the external reference entities.

In one embodiment, the initial potential entities data and the external reference entities data is analyzed and/or compared to identify initial potential entities in the potential entities data having one or more entity attributes that match, to at least a defined threshold degree, entity attributes associated with an external reference entity.

In one embodiment, each of the initial potential entities having one or more entity attributes that match, to at least the threshold degree, entity attributes associated with an external reference entity is designated as a duplicate entity with respect to the matched external reference entity. In one embodiment, data representing these duplicate entities are replaced in the initial potential entitles data with the matched external reference entity, i.e., the duplicate entities are eliminated, to generate revised potential entities data identifying the remaining one or more revised potential entities and one or more entity attributes associated with each of the revised potential entities.

In one embodiment, data representing each of the revised potential entities in the revised potential entities data is analyzed and/or compared with data representing all of the other revised potential entities in the revised potential entities data to identify two or more revised potential entities in the revised potential entities data that have one or more entity attributes that match, to at least a defined threshold degree.

In one embodiment, each of the revised potential entities in the revised potential entities data having one or more entity attributes that match, to at least the threshold degree, are designated as duplicate entities with respect to each other. In one embodiment, one of these duplicate entities is selected as the representative revised potential entity to be used and all the other identified duplicate entities in the revised potential entities data are replaced with the selected representative revised potential entity data, i.e., the duplicate entities are eliminated by collapsing them into a single entity.

In one embodiment, all the remaining revised potential entities are designated as identified entities in the revised potential entities data to transform the revised potential entities data into a master entity list including data indicating the identified entities and their respective attributes data. As a result, the master entity list created is more inclusive, and complete, than the external reference entity data and includes various entity types, such as micro-entities, that are typically not included in external reference entity data.

In one embodiment, the master entity list data includes additional attribute data obtained from one or more third party reference data sources.

In one embodiment, the financial data obtained from two or more types of financial management systems is also analyzed to identify potential commercial transaction data and one or more attributes associated with the potential commercial transaction data, including data indicating commercial transactions and the parties associated with the commercial transactions.

Herein the term "commercial transaction" includes, but is not limited to, financial transactions such as payments made and/or received; invoices sent or received; estimates made, sent, or received; contracts and/or service agreements sent, or received; or any other documents and/or data associated with a purchase, sale, or business related transaction, to and from any entity.

In one embodiment, the financial data obtained from the two or more types of financial management systems is analyzed to identify data entry fields and the organization scheme used by each of the two or more types of financial management systems. In one embodiment, the data entry fields and the organization schemes used by each of the two or more types of financial management systems are then correlated and/or mapped to identify similar and/or identical data or data types.

In one embodiment, the one or more attributes associated with the potential commercial transaction data include, but are not limited to, the type of commercial transaction; the amount, if any, of the commercial transaction; a date of the commercial transaction, or critical dates included in the commercial transaction; a description of the commercial transaction; one or more industries, markets, or areas of endeavor associated with the commercial transaction; the payment method used for the commercial transaction; the payment system, and/or credit account/card provider, used to conduct the commercial transaction; and/or the location and/or device used to conduct the commercial transaction.

In one embodiment, the identified potential commercial transaction data is commonly formatted and arranged in a list of potential commercial transaction data. In one embodiment, the list of potential commercial transaction data is analyzed to identify duplicate potential commercial transaction data entries. In one embodiment, the identified duplicate potential commercial transaction data entries are eliminated, i.e., the list of potential commercial transaction data is "de-duped", to transform the list of potential commercial transaction data into a commercial transaction list including data indicating commercial transactions, the attributes associated with the commercial transactions, and the parties associated with the commercial transactions.

In one embodiment, the commercial transaction list and the master entity list are analyzed and compared to match one or more entities listed in the master entity list with the parties associated with the commercial transactions in the commercial transaction list.

In one embodiment, the matched entities listed in the master entity list are substituted for the respectively matched parties associated with the commercial transactions in the commercial transaction list to create a master commercial transaction list.

In one embodiment, data representing the master entity list and the master commercial transaction list is then stored in one or more databases.

As used herein, the term "database" includes, but is not limited to, any data storage mechanism known at the time of filing, or as developed thereafter, such as, but not limited to, a hard drive or memory; a designated server system or computing system, or a designated portion of one or more server systems or computing systems; a server system network; a distributed database; or an external and/or portable hard drive. Herein, the term "database" can refer to a dedicated mass storage device implemented in software, hardware, or a combination of hardware and software. Herein, the term "database" can refer to an on-line function. Herein, the term "database" can refer to any data storage means that is part of, or under the control of, any computing system, as discussed herein, known at the time of filing, or as developed thereafter.

In one embodiment, data representing the master entity list and the master commercial transaction list is used to generate a graph wherein the entities in the master entity list are nodes and the commercial transactions in the master commercial transaction list are edges connecting the respective entity nodes.

In one embodiment, data representing the master entity list and the master commercial transaction list is used to generate a hierarchical graph wherein the entities in the master entity list are nodes and the commercial transactions in the master commercial transaction list are edges connecting the respective entity nodes and the entity nodes are hierarchically arranged according to their associated commercial transaction edges.

In one embodiment, data representing the master entity list and the master commercial transaction list is used to generate financial profiles for one or more of the entities in the master entity list including static, i.e., relatively unchanging, attributes and dynamic, i.e., variable attributes.

Using the system and method for identifying entities and obtaining financial profile data for the entities using de-duplicated data from two or more types of financial management systems discussed herein, financial data from different types of financial management systems is efficiently and effectively obtained and aggregated. The entities associated with aggregated financial data and commercial transactions in the financial data are then identified and the entities associated with aggregated financial data are correlated to the commercial transactions. The aggregated and correlated financial data is then stored in a data storage system for access and processing.

Consequently, using the system and method for identifying entities and obtaining financial profile data for the entities using de-duplicated data from two or more types of financial management systems discussed herein, data from different types of financial management systems is aggregated, correlated, and made accessible for processing to provide economic profiling, modeling, and insight that was historically unavailable, and to reveal financial connections between entities previously unknown, often even to the entities themselves.

Hardware System Architecture

FIG. 1 is a block diagram of an exemplary hardware architecture for implementing one embodiment of a process for identifying entities and obtaining financial profile data for the entities using de-duplicated data from two or more types of financial management systems, such as exemplary process 300 (FIG. 3) discussed herein.

FIG. 1 includes financial management systems 100A, 100B, through 100N, e.g., "N" computing systems implementing at least part of "N" different types of financial management systems, where "N" is a number greater than, or equal to, two; process system 120, e.g., a computing system associated with a provider of a process for identifying entities and obtaining financial profile data for the entities using de-duplicated data from two or more types of financial management systems; a third party reference database 150, e.g., a third party source of entity attribute data associated with one or more entities; a master lists database 160, e.g., one or more storage locations where master entity list data 126 and master commercial transaction list data 139 are stored; and communication channels 171, 172, 173, 174 and 175.

Financial management systems 100A, 100B, through 100N are representative of two or more, i.e., "N", different financial management systems implemented on various computing systems.

As discussed below, financial data, e.g., first financial management system financial data 105A, second financial management system financial data 105B, through Nth financial management system financial data 105N, is obtained from memories 103A through 103N of financial management systems 100A, 100B, through 100N.

Herein, financial management systems, such as financial management systems 100A, 100B, through 100N, directed to different users, such as personal or business users, and/or for performing different functions, such as financial management, financial transaction management, tax preparation, Point Of Sale (POS), etc. are referred to as different "types" of financial management systems.

Examples of currently available types of financial management systems, such as financial management systems 100A, 100B, through 100N, directed to personal financial data include, but are not limited to, computing system implemented and/or on-line personal financial management systems, packages, programs, modules, or applications; computing system implemented and/or on-line personal financial transaction management systems, packages, programs, modules, or applications; computing system implemented and/or on-line personal tax preparation systems, packages, programs, modules, or applications; computing system implemented and/or on-line personal banking systems, packages, programs, modules, or applications; and computing system implemented and/or on-line personal accounting systems, packages, programs, modules, or applications.

Specific examples of currently available types of personal financial management systems include the financial management systems offered by Quicken™, Quicken Online™, Mint™, Mint Online™, and TurboTax™ available from Intuit, Inc., of Mountain View, Calif.

Examples of currently available types of financial management systems, such as financial management systems 100A, 100B, through 100N, directed to business financial data include, but are not limited to, computing system implemented and/or on-line business financial management systems, packages, programs, modules, or applications; computing system implemented and/or on-line business financial transaction management systems, packages, programs, modules, or applications; computing system implemented and/or on-line Point Of Sale (POS) systems, packages, programs, modules, or applications; computing system implemented and/or on-line business tax preparation systems, packages, programs, modules, or applications; computing system implemented and/or on-line business banking systems, packages, programs, modules, or applications; computing system implemented and/or on-line invoicing systems, packages, programs, modules, or applications; computing system implemented and/or on-line business accounting systems, packages, programs, modules, or applications; and computing system implemented and/or on-line inventory systems, packages, programs, modules, or applications.

Specific examples of currently available types of business financial management systems include the financial management systems offered by Quickbooks™ and Quickbooks Online™ available from Intuit, Inc., of Mountain View, Calif.

In one embodiment, the financial data, such as first financial management system financial data 105A, second financial management system financial data 105B, through Nth financial management system financial data 105N, obtained from two or more types of financial management systems, such as financial management systems 100A, 100B, through 100N, includes, but is not limited to, entity identification and attribute data obtained from registration data provided by users of the financial management systems; entity identification and attribute data obtained from vendor and customer data entered into, or obtained by, the two or more types of financial management systems; transactional data entered onto, or obtained by, the two or more types of financial management systems including payee identification and attribute data, payor identification and attribute data, date and time data, geolocation data, etc.; and/or any other financial data desired and obtainable from the two or more types of financial management systems.

In one embodiment, the financial data is obtained from two or more types of financial management systems offered by the same parent company such as a personal tax preparation system, a personal financial management system, a personal financial transaction management system, and a business financial management system, offered by the same parent company.

For instance, as a specific illustrative example, in one embodiment, the two or more types of financial management systems include the financial management systems offered by Quicken™, Quicken Online™, Mint™, Mint Online™ TurboTax™, Quickbooks™ and Quickbooks Online™, all available from Intuit, Inc., of Mountain View, Calif.

In one embodiment, first financial management system financial data 105A, second financial management system financial data 105B, through Nth financial management system financial data 105N are provided to process system 120 using communications interfaces 109A, 109B, through 109N, communications channels 171, 172, and 173, and communications interface 129.

As seen in FIG. 1, process system 120 includes CPUs 121, memory 122, and communications interface 129.

Process system 120 can be any computing system as discussed herein, and/or as known in the art at the time of filing, and/or as developed thereafter, that includes components that can execute all, or part, of a process for identifying entities and obtaining financial profile data for the entities using de-duplicated data from two or more types of financial management systems in accordance with at least one of the embodiments as described herein.

In one embodiment, memory 122 includes all, or part, of first financial management system financial data 105A, second financial management system financial data 105B, through Nth financial management system financial data 105N as provided to process system 120 using communications interfaces 109A, 109B, through 109N, communications channels 171, 172, and 173, and communications interface 129.

In one embodiment, memory 122 includes all, or part, of entity analysis module 123. In one embodiment, at entity analysis module 123 first financial management system financial data 105A, second financial management system financial data 105B, through Nth financial management system financial data 105N is analyzed to generate potential entity data 124.

In one embodiment, potential entity data 124 includes data indicating the potential entity names and potential entity attributes, in one embodiment, arranged in a common format as a list of identified initial potential entities.

Herein, the term "entity" includes, but is not limited to, any person, group of persons, merchant, group of merchants, business, group of businesses, and/or any other party that can be identified from, and/or is associated with, one or more financial management systems.

Examples of attributes associated with the initial potential entities in potential entity data 124 include, but are not limited to, one or more names associated with an individual entity; one or more names associated with a business entity; one or more addresses associated with an individual entity; one or more addresses associated with a business entity; one or more zip codes, cities, counties, states or countries, associated with an individual entity; one or more zip codes, cities, counties, states or countries, associated with a business entity; one or more geo-locations associated with an individual entity; one or more geo-locations associated with a business entity; one or more phone numbers associated with an individual entity; one or more phone numbers associated with a business entity; one or more E-mail addresses associated with an individual entity; one or more E-mail addresses associated with a business entity; one or more website addresses associated with an individual entity; one or more website addresses associated with a business entity; one or more industries, markets, or areas of endeavor associated with an individual entity; one or more industries, markets, or areas of endeavor associated with a business entity; and/or any other attributes associated with the potential entities desired and/or discernible from the financial data obtained from two or more types of financial management systems.

In one embodiment, the potential entities attribute data includes additional attribute data obtained from third party reference attribute data 155 of third party reference database 150.

In one embodiment, memory 122 includes all, or part, of duplication elimination module 125. In one embodiment, at duplication elimination module 125 the list of identified initial potential entities of potential entity data 124 is analyzed and duplicate potential entity data is identified. In one embodiment, at duplication elimination module 125 the identified duplicate potential entity data entries are eliminated, i.e., potential entity data 124 is "de-duped", to transform potential entity data 124 into a master entity list represented by master entity list data 126.

In one embodiment, memory 122 includes all, or part, of commercial transaction analysis module 133. In one embodiment, at commercial transaction analysis module 133 first financial management system financial data 105A, second financial management system financial data 105B, through Nth financial management system financial data 105N are analyzed to identify potential commercial transaction data 134 including one or more attributes associated with the potential commercial transaction data, and data indicating commercial transactions and the parties associated with the commercial transactions.

Herein the term "commercial transaction" includes, but is not limited to, financial transactions such as payments made and/or received; invoices sent or received; estimates made, sent, or received; contracts and/or service agreements sent, or received; or any other documents and/or data associated with a purchase, sale, or business related transaction, to and from any entity.

In one embodiment, the one or more attributes associated with potential commercial transaction data 134 include, but are not limited to, the type of commercial transaction; the amount, if any, of the commercial transaction; a date of the commercial transaction, or critical dates included in the commercial transaction; a description of the commercial transaction; one or more industries, markets, or areas of endeavor associated with the commercial transaction; and the payment method used for the commercial transaction.

In one embodiment, memory 122 includes all, or part, of duplication elimination module 135. In one embodiment, at duplication elimination module 135 potential commercial transaction data 134 is analyzed and duplicate potential commercial transaction data is identified. In one embodiment, at duplication elimination module 135 the identified duplicate potential commercial transaction data is eliminated, i.e., potential commercial transaction data 134 is "de-duped", to transform potential commercial transaction data 134 into commercial transaction data 136.

In one embodiment, memory 122 includes all, or part, of entity/party substitution module 137. In one embodiment, at entity/party substitution module 137 commercial transaction data 136 and master entity list data 126 are analyzed and compared to match one or more entities listed in master entity list data 126 with the parties associated with the commercial transactions in commercial transaction data 136.

In one embodiment, the matched entities listed in master entity list data 126 are substituted for the respectively matched parties associated with the commercial transactions in commercial transaction data 136 to transform commercial transaction data 136 into a master commercial transaction list represented by master commercial transaction list data 139.

Process system 120 may further include standard user interface devices such as a keyboard (not shown), a mouse (not shown), a printer (not shown), as well as, one or more standard input/output (I/O) devices (not shown), such as a compact disk (CD) or Digital Video Disc (DVD) drive, floppy disk drive, or other digital or waveform port, or other device capable of inputting data to, and outputting data from, a computing system, whether available or known at the time of filing or as later developed.

Also shown in FIG. 1 are third party reference database 150 and master lists database 160.

As noted above, third party reference database 150 includes external reference entities data represented by third party reference attribute data 155 that includes data identifying one or more external reference entities and one or more entity attributes associated with each of the external reference entities. In one embodiment, the data identifying one or more external reference entities and one or more entity attributes associated with each of the external reference entities in third party reference attribute data 155 is used to match the initial potential entities of potential entity data 124 and eliminate duplicate initial potential entities in potential entity data 124. In one embodiment, third party reference attribute data 155 is obtained from a third party reference database 150 associated with Dun and Bradstreet®.

In one embodiment, master lists database 160 represents one or more data storage mechanisms used to store all, or part, of master entity list data 126 and/or master commercial transaction list data 139.

In various embodiments, third party reference database 150 and master lists database 160 are any databases, as discussed herein, and/or as known in the art at the time of filing, and/or as developed after the time of filing.

In one embodiment, any, or all, of communications channels 171, 172, 173, 174 and 175 can be, but are not limited to: any network; a mobile communication link, such as a mobile phone link; a land-line phone link; a cable-based communications channel; a satellite communications channel; the Internet, a cloud, or other network communications channel; and/or any other communications channel, or combination of communications channels, as discussed herein, and/or as known in the art at the time of filing, and/or as developed after the time of filing.

In one embodiment, financial management systems 100A through 100N, process system 120, third party reference database 150, and master lists database 160 are part of a cloud computing environment.

Those of skill in the art will readily recognize that the components shown in FIG. 1, and their respective sub-components, are shown for illustrative purposes only and that architectures with more or fewer components can implement, and benefit from, the invention. In addition, the particular type of, and configuration of, financial management systems 100A through 100N, process system 120, third party reference database 150, and master lists database 160 are not relevant.

In various embodiments, the elements shown in FIG. 1 are grouped into one or more processes, or sub-processes, used to implement all, or part of, a process for identifying entities and obtaining financial profile data for the entities using de-duplicated data from two or more types of financial management systems, such as exemplary process 300 (FIG. 3) discussed herein.

Figure 2A:
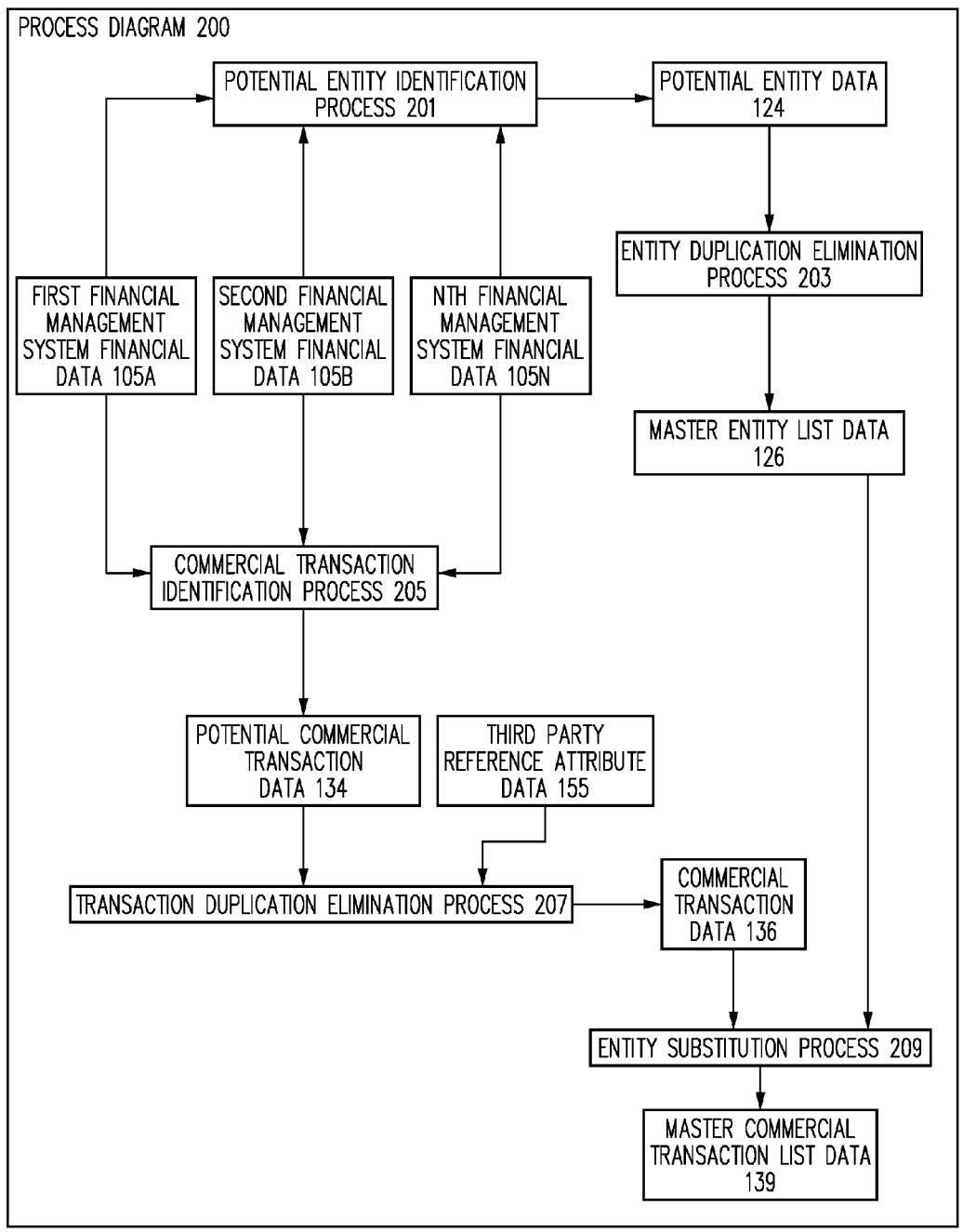
FIG. 2A is a process diagram of part of a process for identifying entities and obtaining financial profile data for the entities using de-duplicated data from two or more types of financial management systems in accordance with one embodiment.

FIG. 2A is a process diagram showing one illustrative example of the interaction of various illustrative processes, or sub-processes, 201, 203, 205, 207, and 209, used to implement all, or part of, a process for identifying entities and obtaining financial profile data for the entities using de-duplicated data from two or more types of financial management systems, such as exemplary process 300 (FIG. 3) discussed herein.

FIGS. 2B, 2C, 2D, 2E, and 2F show illustrative examples of processes 201, 203, 205, 207, and 209 in accordance with one embodiment.

Figure 2B:
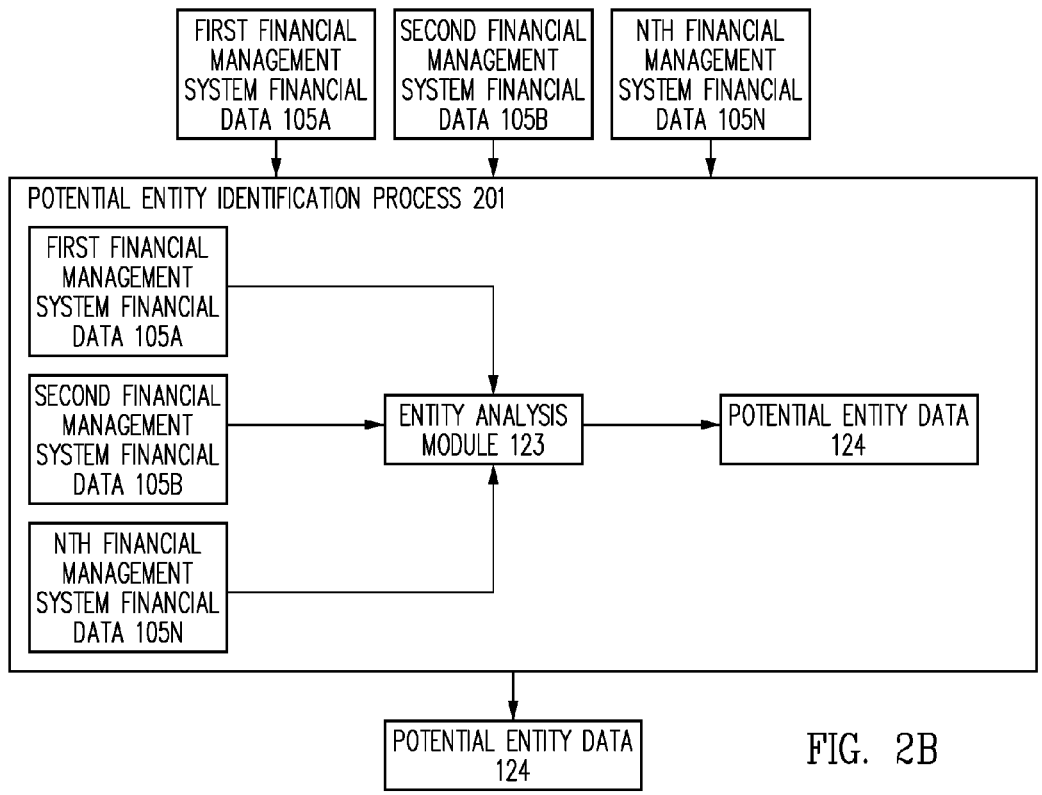
FIG. 2B shows a potential entity identification process in accordance with one embodiment.

Referring to FIG. 1, FIG. 2A, FIG. 2B, FIG. 2C, FIG. 2D, FIG. 2E and FIG. 2F together, first financial management system financial data 105A, second financial management system financial data 105B, through Nth financial management system financial data 105N are provided to potential entity identification process 201 which generates potential entity data 124. FIG. 2B shows potential entity identification process 201 in more detail.

As seen in FIG. 2B, first financial management system financial data 105A, second financial management system financial data 105B, through Nth financial management system financial data 105N are provided as input data to entity analysis module 123. In one embodiment, at entity analysis module 123 first financial management system financial data 105A, second financial management system financial data 105B, through Nth financial management system financial data 105N are analyzed to generate potential entities data 124 identifying initial potential entities and one or more attributes associated with the initial potential entities under the direction of one or more processors, such as CPU 121 of FIG. 1, associated with one or more computing systems, such as process system 120 of FIG. 1.

In one embodiment, potential entities data 124, including the initial potential entity names and potential entity attributes, is arranged in a common format as a list of identified initial potential entities.

Figure 2C:
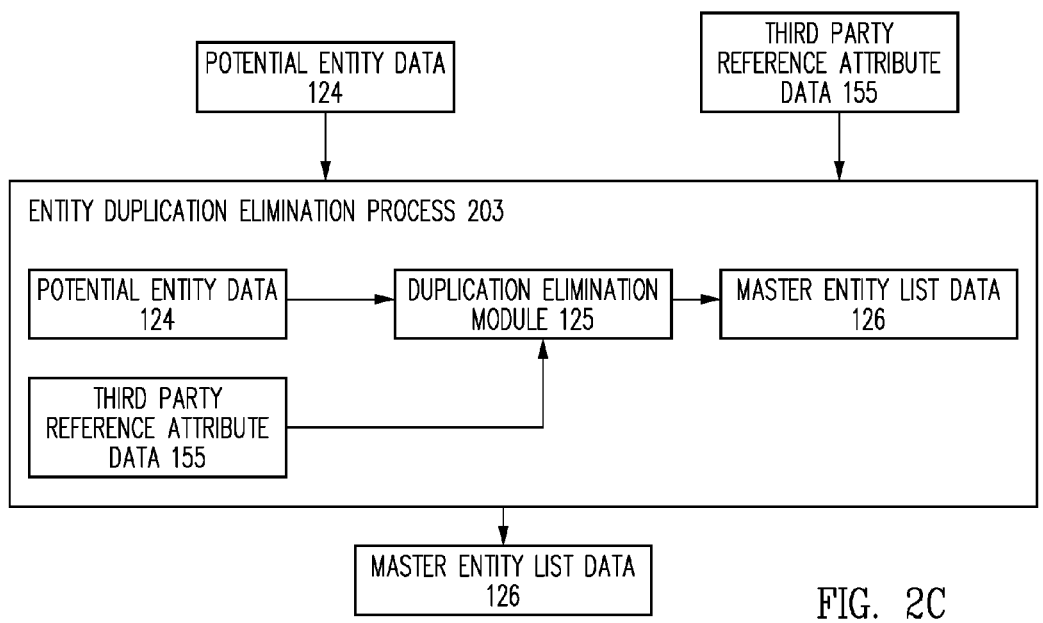
FIG. 2C shows an entity duplication elimination process in accordance with one embodiment.

Referring back to FIG. 1, FIG. 2A, FIG. 2B, FIG. 2C, FIG. 2D, FIG. 2E and FIG. 2F together, potential entities data 124 and third party reference attribute data 155 are provided to entity duplication elimination process 203 which generates master entity list data 126. FIG. 2C shows entity duplication elimination process 203 in more detail.

As seen in FIG. 2C, potential entity data 124 is provided to duplication elimination module 125 which transforms at least part of potential entity data 124 into master entity list data 126.

In one embodiment, potential entity data 124, including the initial potential entity names and initial potential entity attributes, is arranged in a common format as a list of identified initial potential entities referred to herein as initial potential entities data.

In one embodiment, external reference entities data, shown as third party reference attribute data 155 in FIG. 2C, is then obtained from a third party source, such as third party reference database 150. In one embodiment, third party reference attribute data 155 is obtained from Dun and Bradstreet®.

In one embodiment, the external reference entities data of third party reference attribute data 155 includes data identifying one or more external reference entities and one or more entity attributes associated with each of the external reference entities.

In one embodiment, the initial potential entities data of potential entity data 124 and the external reference entities data of third party reference attribute data 155 is analyzed and/or compared by duplication elimination module 125 to identify initial potential entities in the potential entities data of potential entity data 124 having one or more entity attributes that match, to at least a defined threshold degree, entity attributes associated with an external reference entity of third party reference attribute data 155.

In one embodiment, each of the initial potential entities of potential entity data 124 having one or more entity attributes that match, to at least the threshold degree, entity attributes associated with an external reference entity of third party reference attribute data 155 is designated as a duplicate entity with respect to the matched external reference entity. In one embodiment, data representing these duplicate entities is replaced in the initial potential entites data of potential entity data 124 with the matched external reference entity, i.e., the duplicate entities are eliminated, to generate revised potential entities data (not shown) identifying the remaining one or more revised potential entities and one or more entity attributes associated with each of the revised potential entities.

In one embodiment, data representing each of the revised potential entities in the revised potential entities data (not shown) is analyzed and/or compared with data representing all of the other revised potential entities in the revised potential entities data (not shown) to identify two or more revised potential entities in the revised potential entities data that have one or more entity attributes that match, to at least a defined threshold degree.

In one embodiment, each of the revised potential entities in the revised potential entities data having one or more entity attributes that match, to at least the threshold degree, are designated as duplicate entities with respect to each other. In one embodiment, one of these duplicate entities is selected as the representative revised potential entity to be used and all the other identified duplicate entities in the revised potential entities data are replaced with the selected representative revised potential entity data, i.e., the duplicate entities are eliminated.

In one embodiment, all the remaining revised potential entities are designated as identified entities in the revised potential entities data to transform the revised potential entities data into a master entity list of master entity list data 126 including data indicating the identified entities and their respective attributes data.

Figure 2D:
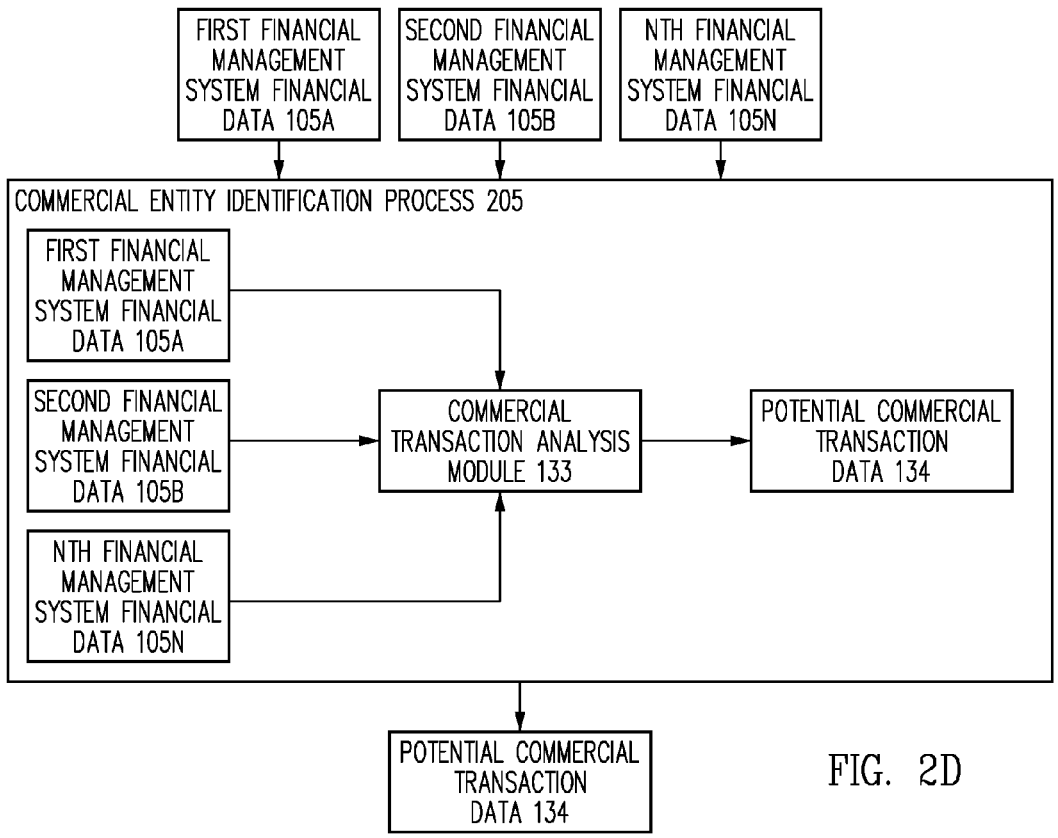
FIG. 2D shows a commercial transaction identification process in accordance with one embodiment.

Referring back to FIG. 1, FIG. 2A, FIG. 2B, FIG. 2C, FIG. 2D, FIG. 2E and FIG. 2F together, in one embodiment, first financial management system financial data 105A, second financial management system financial data 105B, through Nth financial management system financial data 105N are provided to commercial transaction identification process 205 which generates potential commercial transaction data 134. FIG. 2D shows commercial transaction identification process 205 in more detail.

As seen in FIG. 2D, first financial management system financial data 105A, second financial management system financial data 105B, through Nth financial management system financial data 105N are provided as input data to commercial transaction analysis module 133. In one embodiment, at commercial transaction analysis module 133 first financial management system financial data 105A, second financial management system financial data 105B, through Nth financial management system financial data 105N are again analyzed, in this case to identify potential commercial transaction data 134 and attributes associated with the commercial transaction data, including data indicating commercial transactions and the parties associated with the commercial transactions.

Herein the term "commercial transaction" includes, but is not limited to, financial transactions such as payments made and/or received; invoices sent or received; estimates made, sent, or received; contracts and/or service agreements sent, or received; or any other documents and/or data associated with a purchase, sale, or business related transaction, to and from any entity.

In one embodiment, at commercial transaction analysis module 133 first financial management system financial data 105A, second financial management system financial data 105B, through Nth financial management system financial data 105N are analyzed to identify data entry fields and the organization scheme used by each of the two or more types of financial management systems. In one embodiment, the data entry fields and the organization schemes used by each of first financial management system financial data 105A, second financial management system financial data 105B, through Nth financial management system financial data 105N are then correlated and/or mapped to identify similar and/or identical data or data types.

In one embodiment, commercial transaction data 134 is commonly formatted and arranged in a list of commercial transaction data.

Figure 2E:
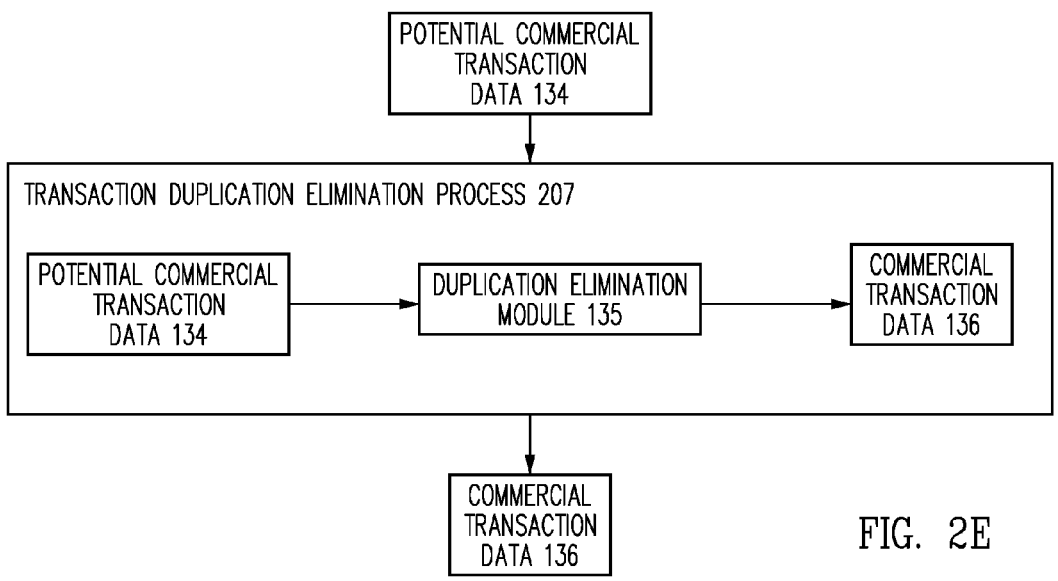
FIG. 2E shows a transaction duplication elimination process in accordance with one embodiment.

Referring back to FIG. 1, FIG. 2A, FIG. 2B, FIG. 2C, FIG. 2D, FIG. 2E and FIG. 2F together, in one embodiment, potential commercial transaction data 134 is provided to transaction duplication elimination process 207 which generates commercial transaction data 136. FIG. 2E shows transaction duplication elimination process 207 in more detail.

As seen in FIG. 2E, potential commercial transaction data 134 is used as input data to duplication elimination module 135. In one embodiment, at duplication elimination module 135 potential commercial transaction data 134 is analyzed and duplicate potential commercial transaction data is identified. In one embodiment, at duplication elimination module 135 the identified duplicate potential commercial transaction data is eliminated, i.e., potential commercial transaction data 134 is "de-duped", to transform potential commercial transaction data 134 into commercial transaction data 136.

Figure 2F:
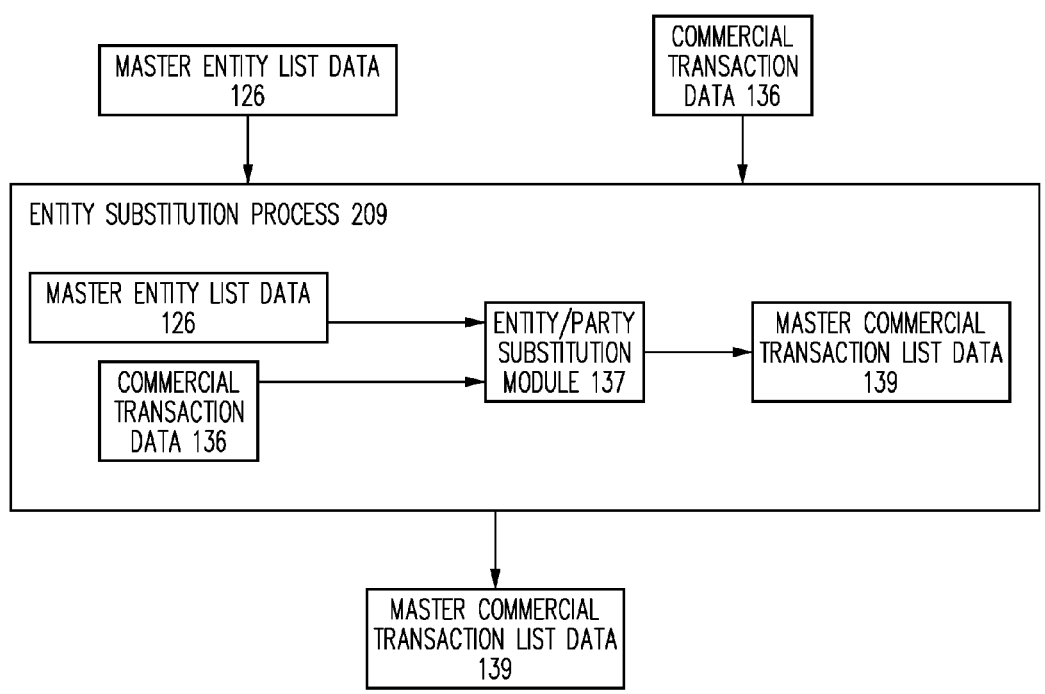
FIG. 2F shows an entity substitution process in accordance with one embodiment.

Referring back to FIG. 1, FIG. 2A, FIG. 2B, FIG. 2C, FIG. 2D, FIG. 2E and FIG. 2F together, master entity list data 126 and commercial transaction data 136 are provided to entity substitution process 209 which generates master commercial transaction list data 139. FIG. 2F shows entity substitution process 209 in more detail.

As seen in FIG. 2F, master entity list data 126 and commercial transaction data 136 are used as input data for entity/party substitution module 137 which transforms at least part of master entity list data 126 and commercial transaction data 136 into master commercial transaction list data 139.

In one embodiment, at entity/party substitution module 137 master entity list data 126 and commercial transaction data 136 are analyzed and compared to match one or more entities listed in master entity list data 126 with the parties associated with the commercial transactions in the commercial transaction list data 136.

In one embodiment, the matched entities listed in master entity list data 126 are substituted for the respectively matched parties associated with the commercial transactions in commercial transaction list data 136 to create a master commercial transaction list data 139.

In the discussion above, certain aspects of one embodiment include processes, sub-processes, steps, operations and/or instructions described herein for illustrative purposes in a particular order and/or grouping. However, the particular order and/or grouping shown and discussed herein are illustrative only and not limiting. Those of skill in the art will recognize that other orders and/or grouping of the processes, sub-processes, steps, operations and/or instructions are possible and, in some embodiments, one or more of the processes, sub-processes, steps, operations and/or instructions discussed above can be combined and/or deleted. In addition, portions of one or more of the processes, sub-processes, steps, operations and/or instructions can be re-grouped as portions of one or more other of processes, sub-processes, steps, operations and/or instructions discussed herein. Consequently, the particular order and/or grouping of the processes, sub-processes, steps, operations and/or instructions discussed herein do not limit the scope of the invention as claimed below.

Process

In accordance with one embodiment, a process for identifying entities and obtaining financial profile data for the entities using de-duplicated data from two or more types of financial management systems includes obtaining financial data from two or more types of financial management systems. The financial data is then analyzed to obtain potential entities data identifying potential entities and one or more attributes associated with the potential entities.

In accordance with one embodiment, duplicate potential entity data in the potential entities data is identified and eliminated to transform the potential entities data into a master entity list including data indicating the identified entities and their respective attributes.

In one embodiment, the financial data is also analyzed to identify commercial transaction data and one or more attributes associated with the commercial transaction data, including data indicating commercial transactions and the parties associated with the commercial transactions. In one embodiment, the commercial transaction data is then analyzed using the master entity list to match one or more entities listed in the master entity list with one or more parties associated with the commercial transactions of the commercial transaction data. In one embodiment, the matched entities listed in the master entity list are then substituted for the respectively matched parties associated with the commercial transactions in the commercial transaction data to create a master commercial transaction list. In one embodiment, data representing the master entity list and the master commercial transaction list is then stored.

Figure 3:
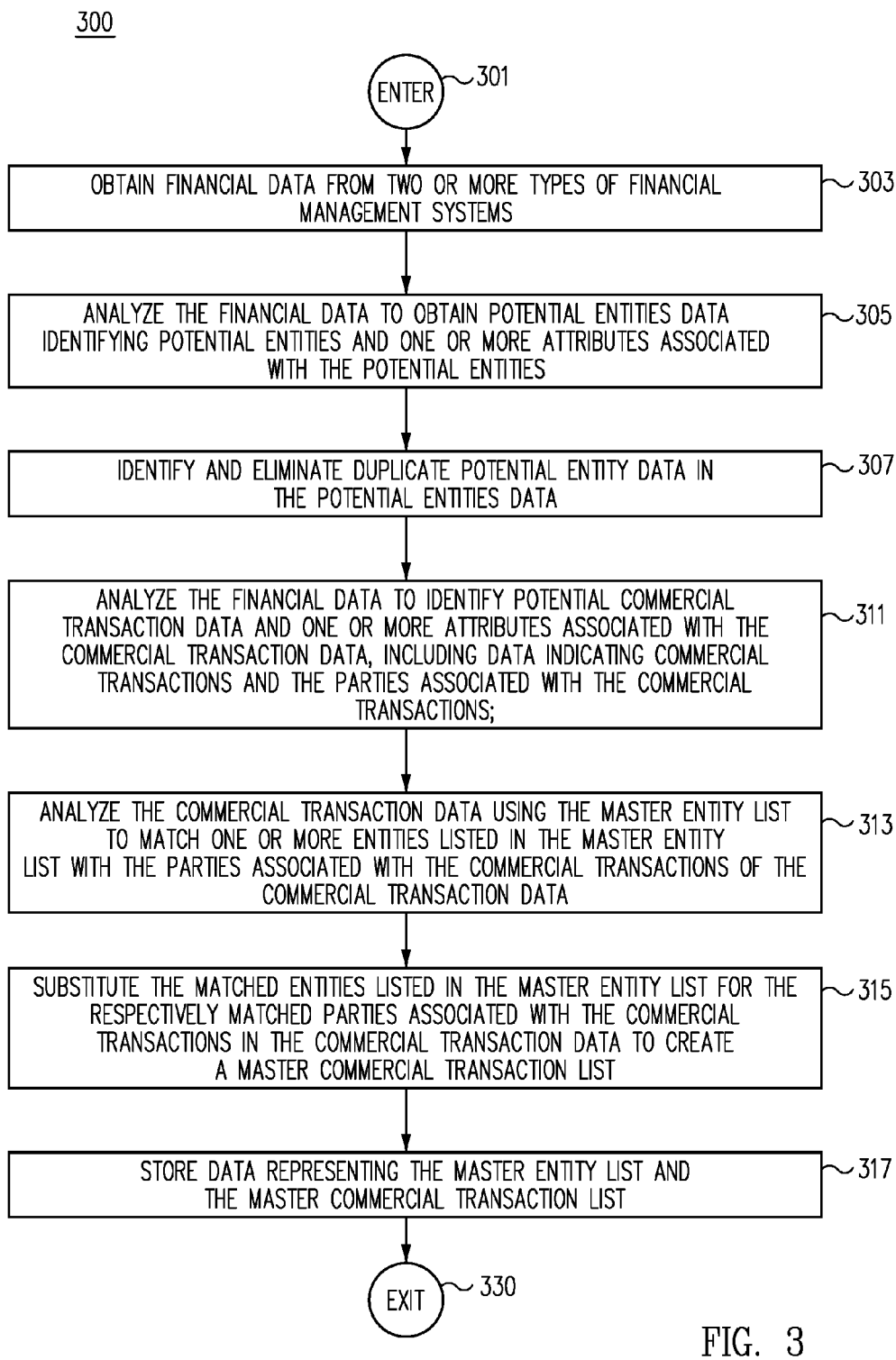
FIG. 3 is a flow chart depicting a process for identifying entities and obtaining financial profile data for the entities using de-duplicated data from two or more types of financial management systems in accordance with one embodiment.

FIG. 3 is a flow chart depicting a process 300 for identifying entities and obtaining financial profile data for the entities using de-duplicated data from two or more types of financial management systems in accordance with one embodiment. Process 300 for identifying entities and obtaining financial profile data for the entities using de-duplicated data from two or more types of financial management systems begins at ENTER OPERATION 301 of FIG. 3 and process flow proceeds to OBTAIN FINANCIAL DATA FROM TWO OR MORE TYPES OF FINANCIAL MANAGEMENT SYSTEMS OPERATION 303.

In one embodiment, at OBTAIN FINANCIAL DATA FROM TWO OR MORE TYPES OF FINANCIAL MANAGEMENT SYSTEMS OPERATION 303 financial data is obtained from two or more types of financial management systems.

As noted above, herein, financial management systems directed to different users, such as personal or business users, and/or for performing different functions, such as financial management, financial transaction management, tax preparation, Point Of Sale, etc. are referred to as different "types" of financial management systems.

Examples of currently available types of financial management systems directed to personal financial data include, but are not limited to, computing system implemented and/or on-line personal financial management systems, packages, programs, modules, or applications; computing system implemented and/or on-line personal financial transaction management systems, packages, programs, modules, or applications; computing system implemented and/or on-line personal tax preparation systems, packages, programs, modules, or applications; computing system implemented and/or on-line personal banking systems, packages, programs, modules, or applications; and computing system implemented and/or on-line personal accounting systems, packages, programs, modules, or applications.

Specific examples of currently available types of personal financial management systems include the financial management systems offered by Quicken™, Quicken Online™, Mint™, Mint Online™, and TurboTax™ available from Intuit, Inc., of Mountain View, Calif.

Examples of currently available types of financial management systems directed to business financial data include, but are not limited to, computing system implemented and/or on-line business financial management systems, packages, programs, modules, or applications; computing system implemented and/or on-line business financial transaction management systems, packages, programs, modules, or applications; computing system implemented and/or on-line Point Of Sale (POS) systems, packages, programs, modules, or applications; computing system implemented and/or on-line business tax preparation systems, packages, programs, modules, or applications; computing system implemented and/or on-line business banking systems, packages, programs, modules, or applications; computing system implemented and/or on-line invoicing systems, packages, programs, modules, or applications; computing system implemented and/or on-line business accounting systems, packages, programs, modules, or applications; and computing system implemented and/or on-line inventory systems, packages, programs, modules, or applications.

Specific examples of currently available types of business financial management systems include the financial management systems offered by Quickbooks™ and Quickbooks Online™ available from Intuit, Inc., of Mountain View, Calif.

In one embodiment, the financial data obtained from two or more types of financial management systems includes, but is not limited to, entity identification and attribute data obtained from registration data provided by users of the financial management systems; entity identification and attribute data obtained from vendor and customer data entered into, or obtained by, the two or more types of financial management systems; transactional data entered onto, or obtained by, the two or more types of financial management systems including payee identification and attribute data, payor identification and attribute data, date and time data, geolocation data, etc.; and/or any other financial data desired and obtainable from the two or more types of financial management systems.

In one embodiment, the financial data is obtained from two or more types of financial management systems offered by the same parent company such as a personal tax preparation system, a personal financial management system, a personal financial transaction management system, and a business financial management system, offered by the same parent company.

For instance, as a specific illustrative example, in one embodiment, the two or more types of financial management systems include the financial management systems offered by Quicken™, Quicken Online™, Mint™, Mint Online™ TurboTax™, Quickbooks™ and Quickbooks Online™, all available from Intuit, Inc., of Mountain View, Calif.

In one embodiment, once financial data is obtained from two or more types of financial management systems at OBTAIN FINANCIAL DATA FROM TWO OR MORE TYPES OF FINANCIAL MANAGEMENT SYSTEMS OPERATION 303, process flow proceeds to ANALYZE THE FINANCIAL DATA TO OBTAIN POTENTIAL ENTITIES DATA IDENTIFYING POTENTIAL ENTITIES AND ONE OR MORE ATTRIBUTES ASSOCIATED WITH THE POTENTIAL ENTITIES OPERATION 305.

In one embodiment, at ANALYZE THE FINANCIAL DATA TO OBTAIN POTENTIAL ENTITIES DATA IDENTIFYING POTENTIAL ENTITIES AND ONE OR MORE ATTRIBUTES ASSOCIATED WITH THE POTENTIAL ENTITIES OPERATION 305, the financial data obtained from the two or more types of financial management systems at OBTAIN FINANCIAL DATA FROM TWO OR MORE TYPES OF FINANCIAL MANAGEMENT SYSTEMS OPERATION 303 is analyzed to obtain initial potential entities data identifying initial potential entities and one or more attributes associated with the initial potential entities.

In one embodiment, at ANALYZE THE FINANCIAL DATA TO OBTAIN POTENTIAL ENTITIES DATA IDENTIFYING POTENTIAL ENTITIES AND ONE OR MORE ATTRIBUTES ASSOCIATED WITH THE POTENTIAL ENTITIES OPERATION 305, the financial data obtained from the two or more types of financial management systems at OBTAIN FINANCIAL DATA FROM TWO OR MORE TYPES OF FINANCIAL MANAGEMENT SYSTEMS OPERATION 303 is analyzed to identify data entry fields and the organization scheme used by each of the two or more types of financial management systems. In one embodiment, the data entry fields and the organization schemes used by each of the two or more types of financial management systems are then correlated and/or mapped to identify similar and/or identical data or data types.

In one embodiment, at ANALYZE THE FINANCIAL DATA TO OBTAIN POTENTIAL ENTITIES DATA IDENTIFYING POTENTIAL ENTITIES AND ONE OR MORE ATTRIBUTES ASSOCIATED WITH THE POTENTIAL ENTITIES OPERATION 305 the financial data obtained from two or more types of financial management systems at OBTAIN FINANCIAL DATA FROM TWO OR MORE TYPES OF FINANCIAL MANAGEMENT SYSTEMS OPERATION 303 is analyzed to obtain initial potential entities data identifying initial potential entities and one or more attributes associated with the initial potential entities under the direction of one or more processors, such as CPU 121 of FIG. 1, associated with one or more computing systems, such as process system 120 of FIG. 1.

Returning to FIG. 3, herein, the term "entity" includes, but is not limited to, any person, group of persons, merchant, group of merchants, business, group of businesses, and/or any other party that can be identified from, and/or is associated with, one or more financial management systems.

Examples of attributes associated with the potential entities include, but are not limited to, one or more names associated with an individual entity; one or more names associated with a business entity; one or more addresses associated with an individual entity; one or more addresses associated with a business entity; one or more zip codes, cities, counties, states or countries, associated with an individual entity; one or more zip codes, cities, counties, states or countries, associated with a business entity; one or more geo-locations associated with an individual entity; one or more geo-locations associated with a business entity; one or more phone numbers associated with an individual entity; one or more phone numbers associated with a business entity; one or more E-mail addresses associated with an individual entity; one or more E-mail addresses associated with a business entity; one or more website addresses associated with an individual entity; one or more website addresses associated with a business entity; one or more industries, markets, or areas of endeavor associated with an individual entity; one or more industries, markets, or areas of endeavor associated with a business entity; one or more social media/social network accounts and/or addresses associated with an individual entity; one or more social media/social network accounts and/or addresses associated with a business entity; and/or any other attributes associated with the potential entities desired and/or discernible from the financial data obtained from two or more types of financial management systems.

In one embodiment, the potential entities attribute data includes additional attribute data obtained from one or more third party reference data sources. As a specific example, in one embodiment, additional attribute data is obtained from one or more data sources provided by Dun and Bradstreet®.

In one embodiment, the initial potential entities data, including the initial potential entity names and initial potential entity attributes, is arranged in a common format as a list of identified initial potential entities.

In one embodiment, once the financial data obtained from the two or more types of financial management systems at OBTAIN FINANCIAL DATA FROM TWO OR MORE TYPES OF FINANCIAL MANAGEMENT SYSTEMS OPERATION 303 is analyzed to obtain initial potential entities data identifying initial potential entities and one or more attributes associated with the initial potential entities at ANALYZE THE FINANCIAL DATA TO OBTAIN POTENTIAL ENTITIES DATA IDENTIFYING POTENTIAL ENTITIES AND ONE OR MORE ATTRIBUTES ASSOCIATED WITH THE POTENTIAL ENTITIES OPERATION 305, process flow proceeds to IDENTIFY AND ELIMINATE DUPLICATE POTENTIAL ENTITY DATA IN THE POTENTIAL ENTITIES DATA OPERATION 307.

In one embodiment, at IDENTIFY AND ELIMINATE DUPLICATE POTENTIAL ENTITY DATA IN THE POTENTIAL ENTITIES DATA OPERATION 307, the list of identified initial potential entities of ANALYZE THE FINANCIAL DATA TO OBTAIN POTENTIAL ENTITIES DATA IDENTIFYING POTENTIAL ENTITIES AND ONE OR MORE ATTRIBUTES ASSOCIATED WITH THE POTENTIAL ENTITIES OPERATION 305 is analyzed to identify and eliminate duplicate potential entity data entries in the list of identified potential entities.

In one embodiment, at IDENTIFY AND ELIMINATE DUPLICATE POTENTIAL ENTITY DATA IN THE POTENTIAL ENTITIES DATA OPERATION 307 the initial potential entities data of ANALYZE THE FINANCIAL DATA TO OBTAIN POTENTIAL ENTITIES DATA IDENTIFYING POTENTIAL ENTITIES AND ONE OR MORE ATTRIBUTES ASSOCIATED WITH THE POTENTIAL ENTITIES OPERATION 305, including the initial potential entity names and initial potential entity attributes, is arranged in a common format as a list of identified initial potential entities referred to herein as initial potential entities data.

In one embodiment, at IDENTIFY AND ELIMINATE DUPLICATE POTENTIAL ENTITY DATA IN THE POTENTIAL ENTITIES DATA OPERATION 307 external reference entities data is then obtained from a third party source. In one embodiment, the external reference entities data is obtained from Dun and Bradstreet®.

In one embodiment, at IDENTIFY AND ELIMINATE DUPLICATE POTENTIAL ENTITY DATA IN THE POTENTIAL ENTITIES DATA OPERATION 307 the external reference entities data includes data identifying one or more external reference entities and one or more entity attributes associated with each of the external reference entities.

In one embodiment, at IDENTIFY AND ELIMINATE DUPLICATE POTENTIAL ENTITY DATA IN THE POTENTIAL ENTITIES DATA OPERATION 307 the initial potential entities data and the external reference entities data is analyzed and/or compared to identify initial potential entities in the potential entities data having one or more entity attributes that match, to at least a defined threshold degree, entity attributes associated with an external reference entity.

In one embodiment, at IDENTIFY AND ELIMINATE DUPLICATE POTENTIAL ENTITY DATA IN THE POTENTIAL ENTITIES DATA OPERATION 307 each of the initial potential entities having one or more entity attributes that match, to at least the threshold degree, entity attributes associated with an external reference entity is designated as a duplicate entity with respect to the matched external reference entity. In one embodiment, at IDENTIFY AND ELIMINATE DUPLICATE POTENTIAL ENTITY DATA IN THE POTENTIAL ENTITIES DATA OPERATION 307 data representing these duplicate entities are replaced in the initial potential entitles data with the matched external reference entity, i.e., the duplicate entities are eliminated, to generate revised potential entities data identifying the remaining one or more revised potential entities and one or more entity attributes associated with each of the revised potential entities.

In one embodiment, at IDENTIFY AND ELIMINATE DUPLICATE POTENTIAL ENTITY DATA IN THE POTENTIAL ENTITIES DATA OPERATION 307 data representing each of the revised potential entities in the revised potential entities data is analyzed and/or compared with data representing all of the other revised potential entities in the revised potential entities data to identify two or more revised potential entities in the revised potential entities data that have one or more entity attributes that match, to at least a defined threshold degree.

In one embodiment, at IDENTIFY AND ELIMINATE DUPLICATE POTENTIAL ENTITY DATA IN THE POTENTIAL ENTITIES DATA OPERATION 307 each of the revised potential entities in the revised potential entities data having one or more entity attributes that match, to at least the threshold degree, are designated as duplicate entities with respect to each other. In one embodiment, one of these duplicate entities is selected as the representative revised potential entity to be used and all the other identified duplicate entities in the revised potential entities data are replaced with the selected representative revised potential entity data, i.e., the duplicate entities are eliminated by collapsing the duplicate entities into a single representative entity.

In one embodiment, at IDENTIFY AND ELIMINATE DUPLICATE POTENTIAL ENTITY DATA IN THE POTENTIAL ENTITIES DATA OPERATION 307 all the remaining revised potential entities are designated as identified entities in the revised potential entities data to transform the revised potential entities data into a master entity list including data indicating the identified entities and their respective attributes data. As a result, the master entity list created is more inclusive, and complete, than the external reference entity data and includes various entity types, such as micro-entities, that are typically not included in external reference entity data.

In one embodiment, once the list of identified initial potential entities of ANALYZE THE FINANCIAL DATA TO OBTAIN POTENTIAL ENTITIES DATA IDENTIFYING POTENTIAL ENTITIES AND ONE OR MORE ATTRIBUTES ASSOCIATED WITH THE POTENTIAL ENTITIES OPERATION 305 is analyzed to identify and eliminate duplicate potential entity data entries in the list of identified potential entities at IDENTIFY AND ELIMINATE DUPLICATE POTENTIAL ENTITY DATA IN THE POTENTIAL ENTITIES DATA OPERATION 307, process flow proceeds to ANALYZE THE FINANCIAL DATA TO IDENTIFY POTENTIAL COMMERCIAL TRANSACTION DATA AND ONE OR MORE ATTRIBUTES ASSOCIATED WITH THE COMMERCIAL TRANSACTION DATA, INCLUDING DATA INDICATING COMMERCIAL TRANSACTIONS AND THE PARTIES ASSOCIATED WITH THE COMMERCIAL TRANSACTIONS OPERATION 311.

In one embodiment, at ANALYZE THE FINANCIAL DATA TO IDENTIFY POTENTIAL COMMERCIAL TRANSACTION DATA AND ONE OR MORE ATTRIBUTES ASSOCIATED WITH THE COMMERCIAL TRANSACTION DATA, INCLUDING DATA INDICATING COMMERCIAL TRANSACTIONS AND THE PARTIES ASSOCIATED WITH THE COMMERCIAL TRANSACTIONS OPERATION 311, the financial data obtained from two or more types of financial management systems of OBTAIN FINANCIAL DATA FROM TWO OR MORE TYPES OF FINANCIAL MANAGEMENT SYSTEMS OPERATION 303 is again analyzed, in this case to identify commercial transaction data and attributes associated with the commercial transaction data, including data indicating commercial transactions and the parties associated with the commercial transactions.

Herein the term "commercial transaction" includes, but is not limited to, financial transactions such as payments made and/or received; invoices sent or received; estimates made, sent, or received; contracts and/or service agreements sent, or received; or any other documents and/or data associated with a purchase, sale, or business related transaction, to and from any entity.

In one embodiment, the financial data obtained from the two or more types of financial management systems is analyzed at ANALYZE THE FINANCIAL DATA TO IDENTIFY POTENTIAL COMMERCIAL TRANSACTION DATA AND ONE OR MORE ATTRIBUTES ASSOCIATED WITH THE COMMERCIAL TRANSACTION DATA, INCLUDING DATA INDICATING COMMERCIAL TRANSACTIONS AND THE PARTIES ASSOCIATED WITH THE COMMERCIAL TRANSACTIONS OPERATION 311 to identify data entry fields and the organization scheme used by each of the two or more types of financial management systems. In one embodiment, the data entry fields and the organization schemes used by each of the two or more types of financial management systems are then correlated and/or mapped to identify similar and/or identical data or data types.

In one embodiment, at ANALYZE THE FINANCIAL DATA TO IDENTIFY POTENTIAL COMMERCIAL TRANSACTION DATA AND ONE OR MORE ATTRIBUTES ASSOCIATED WITH THE COMMERCIAL TRANSACTION DATA, INCLUDING DATA INDICATING COMMERCIAL TRANSACTIONS AND THE PARTIES ASSOCIATED WITH THE COMMERCIAL TRANSACTIONS OPERATION 311, the financial data obtained from two or more types of financial management systems of OBTAIN FINANCIAL DATA FROM TWO OR MORE TYPES OF FINANCIAL MANAGEMENT SYSTEMS OPERATION 303 is again analyzed, in this case to identify commercial transaction data and attributes associated with the commercial transaction data, including data indicating commercial transactions and the parties associated with the commercial transactions under the direction of one or more processors, such as CPU 121 of FIG. 1, associated with one or more computing systems, such as process system 120 of FIG. 1.

Returning to FIG. 3, in one embodiment, the one or more attributes associated with the potential commercial transaction data include, but are not limited to, the type of commercial transaction; the amount, if any, of the commercial transaction; a date of the commercial transaction, or critical dates included in the commercial transaction; a description of the commercial transaction; one or more industries, markets, or areas of endeavor associated with the commercial transaction; the payment method used for the commercial transaction; the payment system, and/or credit account/card provider, used to conduct the commercial transaction; and/or the location and/or device used to conduct the commercial transaction.

In one embodiment, at ANALYZE THE FINANCIAL DATA TO IDENTIFY POTENTIAL COMMERCIAL TRANSACTION DATA AND ONE OR MORE ATTRIBUTES ASSOCIATED WITH THE COMMERCIAL TRANSACTION DATA, INCLUDING DATA INDICATING COMMERCIAL TRANSACTIONS AND THE PARTIES ASSOCIATED WITH THE COMMERCIAL TRANSACTIONS OPERATION 311 the identified commercial transaction data is commonly formatted and arranged in a list of commercial transaction data.

In one embodiment, the list of commercial transaction data generated at ANALYZE THE FINANCIAL DATA TO IDENTIFY POTENTIAL COMMERCIAL TRANSACTION DATA AND ONE OR MORE ATTRIBUTES ASSOCIATED WITH THE COMMERCIAL TRANSACTION DATA, INCLUDING DATA INDICATING COMMER- CIAL TRANSACTIONS AND THE PARTIES ASSOCIATED WITH THE COMMERCIAL TRANSACTIONS OPERATION 311 is analyzed to identify duplicate commercial transaction data entries. In one embodiment, the identified duplicate commercial transaction data entries are eliminated, i.e., the list of commercial transaction data is "de-duped."

Various methods, means, processes and procedures can be used to identify duplicate commercial transaction data entries. Consequently, a detailed discussion of the specific methods, means, processes and procedures used to identify duplicate commercial transaction data entries at ANALYZE THE FINANCIAL DATA TO IDENTIFY POTENTIAL COMMERCIAL TRANSACTION DATA AND ONE OR MORE ATTRIBUTES ASSOCIATED WITH THE COMMERCIAL TRANSACTION DATA, INCLUDING DATA INDICATING COMMERCIAL TRANSACTIONS AND THE PARTIES ASSOCIATED WITH THE COMMERCIAL TRANSACTIONS OPERATION 311 is omitted here to avoid detracting from the invention.

In one embodiment, once the financial data obtained from two or more types of financial management systems of OBTAIN FINANCIAL DATA FROM TWO OR MORE TYPES OF FINANCIAL MANAGEMENT SYSTEMS OPERATION 303 is analyzed to identify commercial transaction data and one or more attributes associated with the commercial transactions, including data indicating commercial transactions and the parties associated with the commercial transactions, at ANALYZE THE FINANCIAL DATA TO IDENTIFY POTENTIAL COMMERCIAL TRANSACTION DATA AND ONE OR MORE ATTRIBUTES ASSOCIATED WITH THE COMMERCIAL TRANSACTION DATA, INCLUDING DATA INDICATING COMMERCIAL TRANSACTIONS AND THE PARTIES ASSOCIATED WITH THE COMMERCIAL TRANSACTIONS OPERATION 311, process flow proceeds to ANALYZE THE COMMERCIAL TRANSACTION DATA USING THE MASTER ENTITY LIST TO MATCH ONE OR MORE ENTITIES LISTED IN THE MASTER ENTITY LIST WITH THE PARTIES ASSOCIATED WITH THE COMMERCIAL TRANSACTIONS OF THE COMMERCIAL TRANSACTION DATA OPERATION 313.

In one embodiment, at ANALYZE THE COMMERCIAL TRANSACTION DATA USING THE MASTER ENTITY LIST TO MATCH ONE OR MORE ENTITIES LISTED IN THE MASTER ENTITY LIST WITH THE PARTIES ASSOCIATED WITH THE COMMERCIAL TRANSACTIONS OF THE COMMERCIAL TRANSACTION DATA OPERATION 313 the commercial transaction list of ANALYZE THE FINANCIAL DATA TO IDENTIFY POTENTIAL COMMERCIAL TRANSACTION DATA AND ONE OR MORE ATTRIBUTES ASSOCIATED WITH THE COMMERCIAL TRANSACTION DATA, INCLUDING DATA INDICATING COMMERCIAL TRANSACTIONS AND THE PARTIES ASSOCIATED WITH THE COMMERCIAL TRANSACTIONS OPERATION 311 and the master entity list of ELIMINATE THE IDENTIFIED DUPLICATE POTENTIAL ENTITY DATA TO TRANSFORM THE POTENTIAL ENTITIES DATA INTO A MASTER ENTITY LIST INCLUDING DATA INDICATING THE IDENTIFIED ENTITIES AND THEIR RESPECTIVE ATTRIBUTES DATA OPERATION 309 are analyzed and compared to match one or more entities listed in the master entity list with the parties associated with the commercial transactions in the commercial transaction list.

In one embodiment, at ANALYZE THE COMMERCIAL TRANSACTION DATA USING THE MASTER ENTITY LIST TO MATCH ONE OR MORE ENTITIES LISTED IN THE MASTER ENTITY LIST WITH THE PARTIES ASSOCIATED WITH THE COMMERCIAL TRANSACTIONS OF THE COMMERCIAL TRANSACTION DATA OPERATION 313 the commercial transaction list of ANALYZE THE FINANCIAL DATA TO IDENTIFY POTENTIAL COMMERCIAL TRANSACTION DATA AND ONE OR MORE ATTRIBUTES ASSOCIATED WITH THE COMMERCIAL TRANSACTION DATA, INCLUDING DATA INDICATING COMMERCIAL TRANSACTIONS AND THE PARTIES ASSOCIATED WITH THE COMMERCIAL TRANSACTIONS OPERATION 311 and the master entity list of ELIMINATE THE IDENTIFIED DUPLICATE POTENTIAL ENTITY DATA TO TRANSFORM THE POTENTIAL ENTITIES DATA INTO A MASTER ENTITY LIST INCLUDING DATA INDICATING THE IDENTIFIED ENTITIES AND THEIR RESPECTIVE ATTRIBUTES DATA OPERATION 309 are analyzed and compared to match one or more entities listed in the master entity list with the parties associated with the commercial transactions in the commercial transaction list under the direction of one or more processors, such as CPU 121 of FIG. 1, associated with one or more computing systems, such as process system 120 of FIG. 1.

Returning to FIG. 3, in one embodiment, at ANALYZE THE COMMERCIAL TRANSACTION DATA USING THE MASTER ENTITY LIST TO MATCH ONE OR MORE ENTITIES LISTED IN THE MASTER ENTITY LIST WITH THE PARTIES ASSOCIATED WITH THE COMMERCIAL TRANSACTIONS OF THE COMMERCIAL TRANSACTION DATA OPERATION 313 the one or more entities listed in the master entity list are matched with the parties associated with the commercial transactions in the commercial transaction list using a look-up table created using the data in the master entity list of ELIMINATE THE IDENTIFIED DUPLICATE POTENTIAL ENTITY DATA TO TRANSFORM THE POTENTIAL ENTITIES DATA INTO A MASTER ENTITY LIST INCLUDING DATA INDICATING THE IDENTIFIED ENTITIES AND THEIR RESPECTIVE ATTRIBUTES DATA OPERATION 309.

In one embodiment, once the commercial transaction list of ANALYZE THE FINANCIAL DATA TO IDENTIFY POTENTIAL COMMERCIAL TRANSACTION DATA AND ONE OR MORE ATTRIBUTES ASSOCIATED WITH THE COMMERCIAL TRANSACTION DATA, INCLUDING DATA INDICATING COMMERCIAL TRANSACTIONS AND THE PARTIES ASSOCIATED WITH THE COMMERCIAL TRANSACTIONS OPERATION 311 and the master entity list of ELIMINATE THE IDENTIFIED DUPLICATE POTENTIAL ENTITY DATA TO TRANSFORM THE POTENTIAL ENTITIES DATA INTO A MASTER ENTITY LIST INCLUDING DATA INDICATING THE IDENTIFIED ENTITIES AND THEIR RESPECTIVE ATTRIBUTES DATA OPERATION 309 are analyzed and compared to match one or more entities listed in the master entity list with the parties associated with the commercial transactions in the commercial transaction list at ANALYZE THE COMMERCIAL TRANSACTION DATA USING THE MASTER ENTITY LIST TO MATCH ONE OR MORE ENTITIES LISTED IN THE MASTER ENTITY LIST WITH THE PARTIES ASSOCIATED WITH THE COMMERCIAL TRANSACTIONS OF THE COMMERCIAL TRANSACTION DATA OPERATION 313 process flow proceeds to SUBSTITUTE THE MATCHED ENTITIES LISTED IN THE MASTER ENTITY LIST FOR THE RESPECTIVELY MATCHED PARTIES ASSOCIATED WITH THE COMMERCIAL TRANSACTIONS IN THE COMMERCIAL TRANSACTION DATA TO CREATE A MASTER COMMERCIAL TRANSACTION LIST OPERATION 315.

In one embodiment, at SUBSTITUTE THE MATCHED ENTITIES LISTED IN THE MASTER ENTITY LIST FOR THE RESPECTIVELY MATCHED PARTIES ASSOCIATED WITH THE COMMERCIAL TRANSACTIONS IN THE COMMERCIAL TRANSACTION DATA TO CREATE A MASTER COMMERCIAL TRANSACTION LIST OPERATION 315 the matched entities listed in the master entity list of ANALYZE THE COMMERCIAL TRANSACTION DATA USING THE MASTER ENTITY LIST TO MATCH ONE OR MORE ENTITIES LISTED IN THE MASTER ENTITY LIST WITH THE PARTIES ASSOCIATED WITH THE COMMERCIAL TRANSACTIONS OF THE COMMERCIAL TRANSACTION DATA OPERATION 313 are substituted for the respectively matched parties associated with the commercial transactions in the commercial transaction list of ANALYZE THE FINANCIAL DATA TO IDENTIFY POTENTIAL COMMERCIAL TRANSACTION DATA AND ONE OR MORE ATTRIBUTES ASSOCIATED WITH THE COMMERCIAL TRANSACTION DATA, INCLUDING DATA INDICATING COMMERCIAL TRANSACTIONS AND THE PARTIES ASSOCIATED WITH THE COMMERCIAL TRANSACTIONS OPERATION 311 to create a master commercial transaction list.

In one embodiment, at SUBSTITUTE THE MATCHED ENTITIES LISTED IN THE MASTER ENTITY LIST FOR THE RESPECTIVELY MATCHED PARTIES ASSOCIATED WITH THE COMMERCIAL TRANSACTIONS IN THE COMMERCIAL TRANSACTION DATA TO CREATE A MASTER COMMERCIAL TRANSACTION LIST OPERATION 315 the matched entities listed in the master entity list of ANALYZE THE COMMERCIAL TRANSACTION DATA USING THE MASTER ENTITY LIST TO MATCH ONE OR MORE ENTITIES LISTED IN THE MASTER ENTITY LIST WITH THE PARTIES ASSOCIATED WITH THE COMMERCIAL TRANSACTIONS OF THE COMMERCIAL TRANSACTION DATA OPERATION 313 are substituted for the respectively matched parties associated with the commercial transactions in the commercial transaction list of ANALYZE THE FINANCIAL DATA TO IDENTIFY POTENTIAL COMMERCIAL TRANSACTION DATA AND ONE OR MORE ATTRIBUTES ASSOCIATED WITH THE COMMERCIAL TRANSACTION DATA, INCLUDING DATA INDICATING COMMERCIAL TRANSACTIONS AND THE PARTIES ASSOCIATED WITH THE COMMERCIAL TRANSACTIONS OPERATION 311 to create a master commercial transaction list under the direction of one or more processors, such as CPU 121 of FIG. 1, associated with one or more computing systems, such as process system 120 of FIG. 1.

Figure 4:
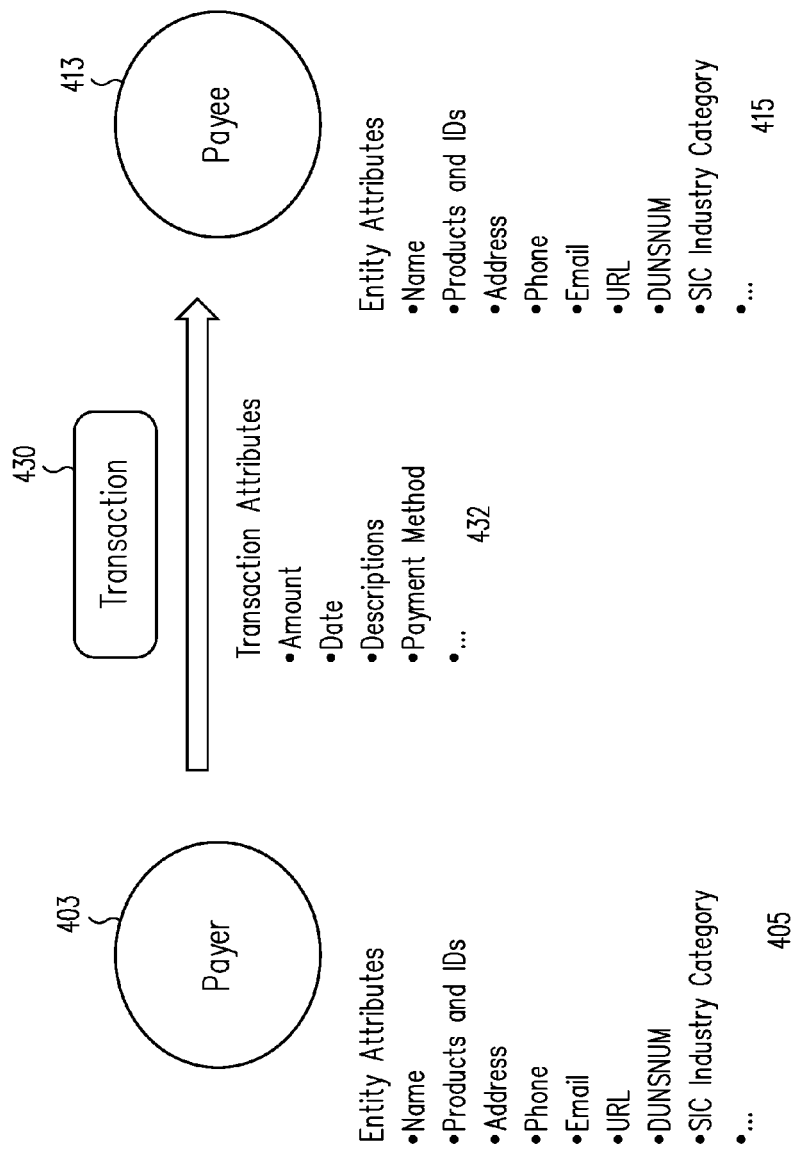
FIG. 4 is a diagram depicting the relationships of data in a master commercial transaction list generated in accordance with one embodiment.

FIG. 4 is a diagram depicting the relationships of data in a master commercial transaction list generated in accordance with one embodiment at SUBSTITUTE THE MATCHED ENTITIES LISTED IN THE MASTER ENTITY LIST FOR THE RESPECTIVELY MATCHED PARTIES ASSOCIATED WITH THE COMMERCIAL TRANSACTIONS IN THE COMMERCIAL TRANSACTION DATA TO CREATE A MASTER COMMERCIAL TRANSACTION LIST OPERATION 315.

Referring to FIGS. 3 and 4 together, payer 403 is identified as an entity in the master entity list of ELIMINATE THE IDENTIFIED DUPLICATE POTENTIAL ENTITY DATA TO TRANSFORM THE POTENTIAL ENTITIES DATA INTO A MASTER ENTITY LIST INCLUDING DATA INDICATING THE IDENTIFIED ENTITIES AND THEIR RESPECTIVE ATTRIBUTES DATA OPERATION 309 and therefore payer 403 includes associated attributes 405 including, in this specific example, the payer's name; the financial management system products used by the payer and the payer's identification used with those financial management system products; the payer's address; the payer's phone number; the payer's e-mail address; the payer's website URL; the payer's listing number with Dun and Bradstreet®, i.e., DUNSNUM; the Standard Industrial Classification (SIC) code category associated with the payer; and/or any other attributes desired and/or discernible from the master entity list of ELIMINATE THE IDENTIFIED DUPLICATE POTENTIAL ENTITY DATA TO TRANSFORM THE POTENTIAL ENTITIES DATA INTO A MASTER ENTITY LIST INCLUDING DATA INDICATING THE IDENTIFIED ENTITIES AND THEIR RESPECTIVE ATTRIBUTES DATA OPERATION 309.

As also seen in FIG. 4, payee 413 is also identified as an entity in the master entity list of ELIMINATE THE IDENTIFIED DUPLICATE POTENTIAL ENTITY DATA TO TRANSFORM THE POTENTIAL ENTITIES DATA INTO A MASTER ENTITY LIST INCLUDING DATA INDICATING THE IDENTIFIED ENTITIES AND THEIR RESPECTIVE ATTRIBUTES DATA OPERATION 309 and therefore payee 413 includes associated attributes 415 including, in this specific example, the payee's name; the financial management system products used by the payee and the payee's identification used with those financial management system products; the payee's address; the payee's phone number; the payee's e-mail address; the payee's website URL; the payee's listing number with Dun and Bradstreet®, i.e., DUNSNUM; the Standard Industrial Classification (SIC) code category associated with the payee; and/or any other attributes desired and/or discernible.

As also seen in FIG. 4, both payer 403 and payee 413 are connected by commercial transaction entry 430 in the master commercial transaction list generated in accordance with one embodiment at SUBSTITUTE THE MATCHED ENTITIES LISTED IN THE MASTER ENTITY LIST FOR THE RESPECTIVELY MATCHED PARTIES ASSOCIATED WITH THE COMMERCIAL TRANSACTIONS IN THE COMMERCIAL TRANSACTION DATA TO CREATE A MASTER COMMERCIAL TRANSACTION LIST OPERATION 315.

As seen in FIG. 4, commercial transaction entry 430 includes transaction attributes data 432 including, but not limited to, the amount of the commercial transaction of commercial transaction entry 430; the date of the commercial transaction of commercial transaction entry 430; a description of the commercial transaction of commercial transaction entry 430; the type of payment method used to conduct the commercial transaction of commercial transaction entry 430; and/or any other attributes desired and/or discernible.

Since, using process 300 for identifying entities and obtaining financial profile data for the entities using de-duplicated data from two or more types of financial management systems, financial data from two or more types of financial management systems is obtained, aggregated and correlated, data representing many, and in some cases all, of the commercial transactions involving payer 403 and/or payee 413 is obtained and presented in the master commercial transaction list of SUBSTITUTE THE MATCHED ENTITIES LISTED IN THE MASTER ENTITY LIST FOR THE RESPECTIVELY MATCHED PARTIES ASSOCIATED WITH THE COMMERCIAL TRANSACTIONS IN THE COMMERCIAL TRANSACTION DATA TO CREATE A MASTER COMMERCIAL TRANSACTION LIST OPERATION 315. Consequently, detailed and potentially very complete data indicating the financial interconnections and types of interconnections, between entities is obtained and provided using process 300 for identifying entities and obtaining financial profile data for the entities using de-duplicated data from two or more types of financial management systems.

In one embodiment, once the matched entities listed in the master entity list of ANALYZE THE COMMERCIAL TRANSACTION DATA USING THE MASTER ENTITY LIST TO MATCH ONE OR MORE ENTITIES LISTED IN THE MASTER ENTITY LIST WITH THE PARTIES ASSOCIATED WITH THE COMMERCIAL TRANSACTIONS OF THE COMMERCIAL TRANSACTION DATA OPERATION 313 are substituted for the respectively matched parties associated with the commercial transactions in the commercial transaction list of ANALYZE THE FINANCIAL DATA TO IDENTIFY POTENTIAL COMMERCIAL TRANSACTION DATA AND ONE OR MORE ATTRIBUTES ASSOCIATED WITH THE COMMERCIAL TRANSACTION DATA, INCLUDING DATA INDICATING COMMERCIAL TRANSACTIONS AND THE PARTIES ASSOCIATED WITH THE COMMERCIAL TRANSACTIONS OPERATION 311 to create a master commercial transaction list at SUBSTITUTE THE MATCHED ENTITIES LISTED IN THE MASTER ENTITY LIST FOR THE RESPECTIVELY MATCHED PARTIES ASSOCIATED WITH THE COMMERCIAL TRANSACTIONS IN THE COMMERCIAL TRANSACTION DATA TO CREATE A MASTER COMMERCIAL TRANSACTION LIST OPERATION 315, process flow proceeds to STORE DATA REPRESENTING THE MASTER ENTITY LIST AND THE MASTER COMMERCIAL TRANSACTION LIST OPERATION 317.

In one embodiment, at STORE DATA REPRESENTING THE MASTER ENTITY LIST AND THE MASTER COMMERCIAL TRANSACTION LIST OPERATION 317 data representing the master entity list of ELIMINATE THE IDENTIFIED DUPLICATE POTENTIAL ENTITY DATA TO TRANSFORM THE POTENTIAL ENTITIES DATA INTO A MASTER ENTITY LIST INCLUDING DATA INDICATING THE IDENTIFIED ENTITIES AND THEIR RESPECTIVE ATTRIBUTES DATA OPERATION 309 and the master commercial transaction list of SUBSTITUTE THE MATCHED ENTITIES LISTED IN THE MASTER ENTITY LIST FOR THE RESPECTIVELY MATCHED PARTIES ASSOCIATED WITH THE COMMERCIAL TRANSACTIONS IN THE COMMERCIAL TRANSACTION DATA TO CREATE A MASTER COMMERCIAL TRANSACTION LIST OPERATION 315 is stored in one or more databases.

In one embodiment, data representing the master entity list of ELIMINATE THE IDENTIFIED DUPLICATE POTENTIAL ENTITY DATA TO TRANSFORM THE POTENTIAL ENTITIES DATA INTO A MASTER ENTITY LIST INCLUDING DATA INDICATING THE IDENTIFIED ENTITIES AND THEIR RESPECTIVE ATTRIBUTES DATA OPERATION 309 and the master commercial transaction list of SUBSTITUTE THE MATCHED ENTITIES LISTED IN THE MASTER ENTITY LIST FOR THE RESPECTIVELY MATCHED PARTIES ASSOCIATED WITH THE COMMERCIAL TRANSACTIONS IN THE COMMERCIAL TRANSACTION DATA TO CREATE A MASTER COMMERCIAL TRANSACTION LIST OPERATION 315 is used to generate a graph wherein the entities in the master entity list are nodes and the commercial transactions in the master commercial transaction list are edges connecting the respective entity nodes.

In one embodiment, data representing the master entity list of ELIMINATE THE IDENTIFIED DUPLICATE POTENTIAL ENTITY DATA TO TRANSFORM THE POTENTIAL ENTITIES DATA INTO A MASTER ENTITY LIST INCLUDING DATA INDICATING THE IDENTIFIED ENTITIES AND THEIR RESPECTIVE ATTRIBUTES DATA OPERATION 309 and the master commercial transaction list of SUBSTITUTE THE MATCHED ENTITIES LISTED IN THE MASTER ENTITY LIST FOR THE RESPECTIVELY MATCHED PARTIES ASSOCIATED WITH THE COMMERCIAL TRANSACTIONS IN THE COMMERCIAL TRANSACTION DATA TO CREATE A MASTER COMMERCIAL TRANSACTION LIST OPERATION 315 is used to generate a hierarchical graph wherein the entities in the master entity list are nodes and the commercial transactions in the master commercial transaction list are edges connecting the respective entity nodes and the entity nodes are hierarchically arranged according to their associated commercial transaction edges.

In one embodiment, data representing the master entity list of ELIMINATE THE IDENTIFIED DUPLICATE POTENTIAL ENTITY DATA TO TRANSFORM THE POTENTIAL ENTITIES DATA INTO A MASTER ENTITY LIST INCLUDING DATA INDICATING THE IDENTIFIED ENTITIES AND THEIR RESPECTIVE ATTRIBUTES DATA OPERATION 309 and the master commercial transaction list of SUBSTITUTE THE MATCHED ENTITIES LISTED IN THE MASTER ENTITY LIST FOR THE RESPECTIVELY MATCHED PARTIES ASSOCIATED WITH THE COMMERCIAL TRANSACTIONS IN THE COMMERCIAL TRANSACTION DATA TO CREATE A MASTER COMMERCIAL TRANSACTION LIST OPERATION 315 is used to generate financial profiles for one or more of the entities in the master entity list.

Figure 5:
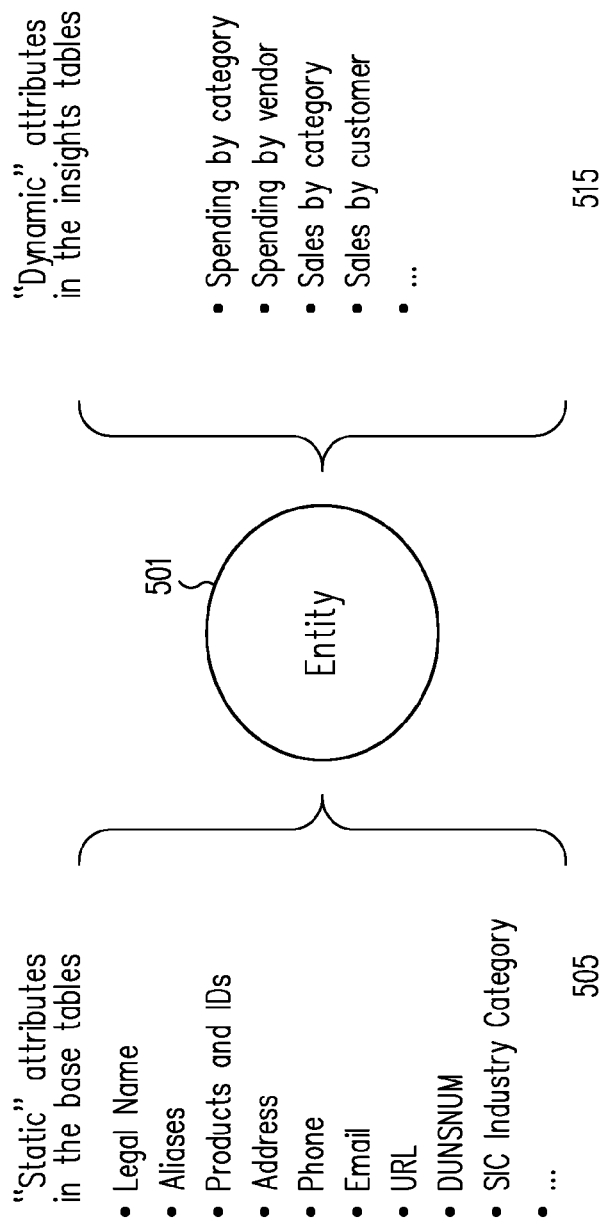
FIG. 5 is a diagram depicting the relationships of data in an entity profile generated in accordance with one embodiment.

FIG. 5 is a diagram depicting the relationships of data in an entity profile generated in accordance with one embodiment.

As seen in FIG. 5, in one embodiment, each entity 501 in the master entity list includes static attributes 505 and dynamic attributes 515 that combined yield an entity profile for the each entity 501.

In one embodiment, static attributes 505 are those attributes obtained at ANALYZE THE FINANCIAL DATA TO OBTAIN POTENTIAL ENTITIES DATA IDENTIFYING POTENTIAL ENTITIES AND ONE OR MORE ATTRIBUTES ASSOCIATED WITH THE POTENTIAL ENTITIES OPERATION 305 and, in this specific illustrative example, include the entity's name; any aliases associated with entity, including those discovered in the duplicate data identification and elimination process of IDENTIFY AND ELIMINATE DUPLICATE POTENTIAL ENTITY DATA IN THE POTENTIAL ENTITIES DATA OPERATION 307 and ELIMINATE THE IDENTIFIED DUPLICATE POTENTIAL ENTITY DATA TO TRANSFORM THE POTENTIAL ENTITIES DATA INTO A MASTER ENTITY LIST INCLUDING DATA INDICATING THE IDENTIFIED ENTITIES AND THEIR RESPECTIVE ATTRIBUTES DATA OPERATION 309; the financial management system products used by the entity and the entity's identification used with those financial management system products; the entity's address; the entity's phone number; the entity's e-mail address; the entity's website URL; the entity's listing number with Dun and Bradstreet®, i.e., DUNSNUM; and the Standard Industrial Classification (SIC) code category associated with the entity, and/or any other static attributes 505 desired and discernible from the data of ANALYZE THE FINAN- CIAL DATA TO OBTAIN POTENTIAL ENTITIES DATA IDENTIFYING POTENTIAL ENTITIES AND ONE OR MORE ATTRIBUTES ASSOCIATED WITH THE POTENTIAL ENTITIES OPERATION 305.

In one embodiment, the dynamic attributes 515 associated with entity 501 include those identified by virtue of the creation, and analysis, of the data in the master commercial transaction list of SUBSTITUTE THE MATCHED ENTITIES LISTED IN THE MASTER ENTITY LIST FOR THE RESPECTIVELY MATCHED PARTIES ASSOCIATED WITH THE COMMERCIAL TRANSACTIONS IN THE COMMERCIAL TRANSACTION DATA TO CREATE A MASTER COMMERCIAL TRANSACTION LIST OPERATION 315. In this specific illustrative example, the dynamic attributes 515 include, but are not limited to, the entity's spending by category; the entity's spending with identified vendors, i.e., other identified entities; the entity's sales by category; the entity's sales to identified customers, i.e., other identified entities; and/or any other dynamic attributes 515 desired and/or discernible using the data in the master commercial transaction list of SUBSTITUTE THE MATCHED ENTITIES LISTED IN THE MASTER ENTITY LIST FOR THE RESPECTIVELY MATCHED PARTIES ASSOCIATED WITH THE COMMERCIAL TRANSACTIONS IN THE COMMERCIAL TRANSACTION DATA TO CREATE A MASTER COMMERCIAL TRANSACTION LIST OPERATION 315.

Since, using process 300 for identifying entities and obtaining financial profile data for the entities using de-duplicated data from two or more types of financial management systems, financial data from two or more types of financial management systems is obtained, aggregated, and correlated, data representing many, and in some cases all, of the commercial transactions involving entity 501 is obtained. Consequently, a very detailed, complete, and often highly predictive, entity profile is generated using process 300 for identifying entities and obtaining financial profile data for the entities using de-duplicated data from two or more types of financial management systems, in most cases a much more complete and detailed financial profile is created than can be generated using only a single source of data, such as a single type of financial management system.

In one embodiment, once data representing the master entity list of ELIMINATE THE IDENTIFIED DUPLICATE POTENTIAL ENTITY DATA TO TRANSFORM THE POTENTIAL ENTITIES DATA INTO A MASTER ENTITY LIST INCLUDING DATA INDICATING THE IDENTIFIED ENTITIES AND THEIR RESPECTIVE ATTRIBUTES DATA OPERATION 309 and the master commercial transaction list of SUBSTITUTE THE MATCHED ENTITIES LISTED IN THE MASTER ENTITY LIST FOR THE RESPECTIVELY MATCHED PARTIES ASSOCIATED WITH THE COMMERCIAL TRANSACTIONS IN THE COMMERCIAL TRANSACTION DATA TO CREATE A MASTER COMMERCIAL TRANSACTION LIST OPERATION 315 is stored in one or more databases at STORE DATA REPRESENTING THE MASTER ENTITY LIST AND THE MASTER COMMERCIAL TRANSACTION LIST OPERATION 317, process flow proceeds to EXIT OPERATION 330.

In one embodiment, at EXIT OPERATION 330, process 300 for identifying entities and obtaining financial profile data for the entities using de-duplicated data from two or more types of financial management systems is exited to await new data.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

Using process 300 for identifying entities and obtaining financial profile data for the entities using de-duplicated data from two or more types of financial management systems discussed above, financial data from different types of financial management systems is efficiently and effectively obtained and aggregated. The entities associated with aggregated financial data and commercial transactions in the financial data are then identified and the entities associated with aggregated financial data and the commercial transactions are then correlated. The aggregated and correlated financial data is then stored in a data storage system for access and processing.

Consequently, using process 300 for identifying entities and obtaining financial profile data for the entities using de-duplicated data from two or more types of financial management systems, data from different types of financial management systems is aggregated, correlated, and made accessible for processing to provide economic profiling, modeling, and insight that was historically unavailable, and to reveal financial connections between entities previously unknown, even to the entities themselves.

As discussed in more detail above, using the above embodiments, with little or no modification and/or input, there is considerable flexibility, adaptability, and opportunity for customization to meet the specific needs of various parties under numerous circumstances.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as, but not limited to, "activating", "accessing", "adding", "alerting", "applying", "analyzing", "associating", "calculating", "capturing", "categorizing", "classifying", "comparing", "creating", "defining", "detecting", "determining", "distributing", "eliminating", "encrypting", "extracting", "filtering", "forwarding", "generating", "identifying", "implementing", "informing", "monitoring", "obtaining", "posting", "processing", "providing", "receiving", "requesting", "saving", "sending", "storing", "substituting", "transferring", "transforming", "transmitting", "using", etc., refer to the action and process of a computing system or similar electronic device that manipulates and operates on data represented as physical (electronic) quantities within the computing system memories, resisters, caches or other information storage, transmission or display devices.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as discussed herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s, or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A computing system implemented method for identifying entities and obtaining financial profile data for the entities using de-duplicated data from two or more types of financial management systems comprising the following, which when executed individually or collectively by any set of one or more processors perform a process including:

obtaining financial data from two or more types of financial management systems;

analyzing the financial data to obtain initial potential entities data identifying one or more initial potential entities and one or more entity attributes associated with each initial potential entity of the initial potential entities;

obtaining external reference entities data from a third party source identifying one or more external reference entities and one or more entity attributes associated with each external reference entity of the external reference entities;

analyzing the initial potential entities data and the external reference entities data to identify initial potential entities in the potential entities data having one or more entity attributes that match, to at least a threshold degree, entity attributes associated with an external reference entity;

designating each initial potential entity of the initial potential entities having one or more entity attributes that match, to at least a threshold degree, entity attributes associated with an external reference entity as duplicate entities with respect to the matched external reference entity and replacing the designated duplicate entities in the initial potential entities data with the matched external reference entity to generate revised potential entities data identifying one or more revised potential entities and one or more entity attributes associated with each of the revised potential entities;

comparing data representing each revised potential entity of the revised potential entities in the revised potential entities data with data representing all of the other revised potential entities in the revised potential entities data to identify revised potential entities that have one or more entity attributes that match, to at least a threshold degree;

designating each revised potential entity of the revised potential entities in the revised potential entities data having one or more entity attributes that match, to at least a threshold degree, as duplicate entities with respect to each other;

selecting one of the duplicate entities as the revised potential entity and eliminating all the other identified duplicate entities in the revised potential entities data; and designating all the remaining revised potential entities as identified entities in the revised potential entities data to transform the revised potential entities data into a master entity list including data indicating the identified entities and their respective attributes data;

analyzing the financial data to identify commercial transaction data and one or more attributes associated with the commercial transaction data, including data indicating commercial transactions and parties associated with the commercial transactions;

analyzing the commercial transaction data using the master entity list to match one or more entities listed in the master entity list with the parties associated with the commercial transactions of the commercial transaction data;

substituting the matched entities listed in the master entity list for the respectively matched parties associated with the commercial transactions in the commercial transaction data to create a master commercial transaction list; and storing data representing the master entity list and the master commercial transaction list.

2. The computing system implemented method for identifying entities and obtaining financial profile data for the entities using de-duplicated data from the two or more types of financial management systems of claim 1 wherein the two or more types of financial management systems are selected from the group of financial management systems consisting of:

computing system implemented personal financial management systems, packages, programs, modules, or applications;

computing system implemented business financial management systems, packages, programs, modules, or applications;

online personal financial management systems, packages, programs, modules, or applications;

online business financial management systems, packages, programs, modules, or applications;

computing system implemented personal commercial transaction management systems, packages, programs, modules, or applications;

computing system implemented business commercial transaction management systems, packages, programs, modules, or applications;

online personal commercial transaction management systems, packages, programs, modules, or applications;

online business commercial transaction management systems, packages, programs, modules, or applications;

computing system implemented personal tax preparation systems, packages, programs, modules, or applications;

computing system implemented business tax preparation systems, packages, programs, modules, or applications;

online personal tax preparation systems, packages, programs, modules, or applications;

online business tax preparation systems, packages, programs, modules, or applications;

computing system implemented personal online banking systems, packages, programs, modules, or applications;

computing system implemented business online banking systems, packages, programs, modules, or applications;

online personal banking systems, packages, programs, modules, or applications;

online business banking systems, packages, programs, modules, or applications;

computing system implemented invoicing, packages, programs, modules, or applications;

online invoicing, packages, programs, modules, or applications;

computing system implemented personal accounting systems, packages, programs, modules, or applications;

computing system implemented business accounting systems, packages, programs, modules, or applications;

online personal accounting systems, packages, programs, modules, or applications;

online business accounting systems, packages, programs, modules, or applications; and any combination thereof.

3. The computing system implemented method for identifying entities and obtaining financial profile data for the entities using de-duplicated data from the two or more types of financial management systems of claim 1 wherein at least one of the two or more types of financial management systems is selected from the group of personal financial management systems consisting of:

computing system implemented personal financial management systems, packages, programs, modules, or applications;

online personal financial management systems, packages, programs, modules, or applications;

computing system implemented personal commercial transaction management systems, packages, programs, modules, or applications;

online personal commercial transaction management systems, packages, programs, modules, or applications;

computing system implemented personal tax preparation systems, packages, programs, modules, or applications;

online personal tax preparation systems, packages, programs, modules, or applications;

computing system implemented personal banking systems, packages, programs, modules, or applications;

online personal banking systems, packages, programs, modules, or applications;

computing system implemented personal accounting systems, packages, programs, modules, or applications; and online personal accounting systems, packages, programs, modules, or applications; and at least one of the two or more types of financial management systems is selected from the group of business financial management systems consisting of:

computing system implemented business financial management systems, packages, programs, modules, or applications;

online business financial management systems, packages, programs, modules, or applications;

computing system implemented business commercial transaction management systems, packages, programs, modules, or applications;

online business commercial transaction management systems, packages, programs, modules, or applications;

computing system implemented business tax preparation systems, packages, programs, modules, or applications;

online business tax preparation systems, packages, programs, modules, or applications;

computing system implemented business banking systems, packages, programs, modules, or applications;

online business banking systems, packages, programs, modules, or applications;

computing system implemented invoicing, packages, programs, modules, or applications;

online invoicing, packages, programs, modules, or applications;

computing system implemented business accounting systems, packages, programs, modules, or applications; and online business accounting systems, packages, programs, modules, or applications.

4. The computing system implemented method for identifying entities and obtaining financial profile data for the entities using de-duplicated data from the two or more types of financial management systems of claim 1 wherein at least one of the one or more entity attributes is selected from the group of attributes consisting of:

one or more names associated with an individual entity;

one or more names associated with a business entity; one or more addresses associated with an individual entity;
one or more addresses associated with a business entity;
one or more geo-locations associated with an individual entity; one or more geo-locations associated with a business entity;
one or more phone numbers associated with an individual entity; one or more phone numbers associated with a business entity;
one or more E-mail addresses associated with an individual entity; one or more E-mail addresses associated with a business entity;
one or more website addresses associated with an individual entity; one or more website addresses associated with a business entity;
one or more industries, markets, or areas of endeavor associated with an individual entity;
one or more industries, markets, or areas of endeavor associated with a business entity; and any combination thereof.

5. The computing system implemented method for identifying entities and obtaining financial profile data for the entities using de-duplicated data from the two or more types of financial management systems of claim 1 wherein the commercial transaction data in the master commercial transaction list includes commercial transaction data representing payments made by, and/or payments received by, one or more entities in the master entity list.

6. The computing system implemented method for identifying entities and obtaining financial profile data for the entities using de-duplicated data from the two or more types of financial management systems of claim 1 wherein the commercial transaction data in the master commercial transaction list includes commercial transaction data representing invoices sent by and/or invoices received by one or more entities in the master entity list.

7. The computing system implemented method for identifying entities and obtaining financial profile data for the entities using de-duplicated data from the two or more types of financial management systems of claim 1 wherein the commercial transaction data in the master commercial transaction list includes commercial transaction data representing project estimates sent by and/or project estimates received by one or more entities in the master entity list.

8. The computing system implemented method for identifying entities and obtaining financial profile data for the entities using de-duplicated data from the two or more types of financial management systems of claim 1 wherein the master entity list and the master commercial transaction list are used to generate a financial profile for one or more of the entities listed in the master entity list by, for
each entity in the master entity list, aggregating all commercial transaction data in the master commercial transaction list associated with the entity.

9. The computing system implemented method for identifying entities and obtaining financial profile data for the entities using de-duplicated data from the two or more types of financial management systems of claim 1 wherein the master entity list and the master commercial transaction list are used to generate a financial profile for one or more of the entities listed in the master entity list by, for each entity in the master entity list, aggregating all commercial transaction data in the master commercial transaction list associated with the entity and processing the aggregated commercial transaction data using one or more analysis parameters.

10. A system for identifying entities and obtaining financial profile data for the entities using de-duplicated data from two or more types of financial management systems comprising:
at least one processor; and at least one memory coupled to the at least one processor, the at least one memory having stored therein instructions which when executed by any set of the at least one processors, perform a process for dynamically identifying and suggesting geographically related appointments, the process for dynamically identifying and suggesting geographically related appointments including:
obtaining financial data from two or more types of financial management systems;
analyzing the financial data to obtain initial potential entities data identifying one or more initial potential entities and one or more entity attributes associated with each initial potential entity of the initial potential entities;
obtaining external reference entities data from a third party source identifying one or more external reference entities and one or more entity attributes associated with each external reference entity of the external reference entities;
analyzing the initial potential entities data and the external reference entities data to identify initial potential entities in the potential entities data having one or more entity attributes that match, to at least a threshold degree, entity attributes associated with an external reference entity;
designating each initial potential entity of the initial potential entities having one or more entity attributes that match, to at least a threshold degree, entity attributes associated with an external reference entity as duplicate entities with respect to the matched external reference entity and replacing the designated duplicate entities in the initial potential entities data with the matched external reference entity to generate revised potential entities data identifying one or more revised potential entities and one or more entity attributes associated with each revised potential entity of the revised potential entities;
comparing data representing each revised potential entity of the revised potential entities in the revised potential entities data with data representing all of the other revised potential entities in the revised potential entities data to identify revised potential entities that have one or more entity attributes that match, to at least a threshold degree;
designating each revised potential entity of the revised potential entities in the revised potential entities data having one or more entity attributes that match, to at least a threshold degree, as duplicate entities with respect to each other;
selecting one of the duplicate entities as the revised potential entity and eliminating all the other identified duplicate entities in the revised potential entities data; and designating all the remaining revised potential entities as identified entities in the revised potential entities data to transform the revised potential entities data into a master entity list including data indicating the identified entities and their respective attributes data;
analyzing the financial data to identify commercial transaction data and one or more attributes associated with the commercial transaction data, including data indicating commercial transactions and parties associated with the commercial transactions;
analyzing the commercial transaction data using the master entity list to match one or more entities listed in the master entity list with the parties associated with the commercial transactions of the commercial transaction data;

substituting the matched entities listed in the master entity list for respectively matched parties associated with the commercial transactions in the commercial transaction data to create a master commercial transaction list; and storing data representing the master entity list and the master commercial transaction list.

11. The system for identifying entities and obtaining financial profile data for the entities using de-duplicated data from the two or more types of financial management systems of claim 10 wherein the two or more types of financial management systems are selected from the group of financial management systems consisting of:

computing system implemented personal financial management systems, packages, programs, modules, or applications;

computing system implemented business financial management systems, packages, programs, modules, or applications;

online personal financial management systems, packages, programs, modules, or applications;

online business financial management systems, packages, programs, modules, or applications;

computing system implemented personal commercial transaction management systems, packages, programs, modules, or applications;

computing system implemented business commercial transaction management systems, packages, programs, modules, or applications;

online personal commercial transaction management systems, packages, programs, modules, or applications;

online business commercial transaction management systems, packages, programs, modules, or applications;

computing system implemented personal tax preparation systems, packages, programs, modules, or applications;

computing system implemented business tax preparation systems, packages, programs, modules, or applications;

online personal tax preparation systems, packages, programs, modules, or applications;

online business tax preparation systems, packages, programs, modules, or applications;

computing system implemented personal online banking systems, packages, programs, modules, or applications;

computing system implemented business online banking systems, packages, programs, modules, or applications;

online personal banking systems, packages, programs, modules, or applications;

online business banking systems, packages, programs, modules, or applications;

computing system implemented invoicing, packages, programs, modules, or applications;

online invoicing, packages, programs, modules, or applications;

computing system implemented personal accounting systems, packages, programs, modules, or applications;

computing system implemented business accounting systems, packages, programs, modules, or applications;

online personal accounting systems, packages, programs, modules, or applications;

online business accounting systems, packages, programs, modules, or applications; and any combination thereof.

12. The system for identifying entities and obtaining financial profile data for the entities using de-duplicated data from the two or more types of financial management systems of claim 10 wherein at least one of the two or more types of financial management systems is selected from the group of personal financial management systems consisting of:

computing system implemented personal financial management systems, packages, programs, modules, or applications;

online personal financial management systems, packages, programs, modules, or applications;

computing system implemented personal commercial transaction management systems, packages, programs, modules, or applications;

online personal commercial transaction management systems, packages, programs, modules, or applications;

computing system implemented personal tax preparation systems, packages, programs, modules, or applications;

online personal tax preparation systems, packages, programs, modules, or applications;

computing system implemented personal banking systems, packages, programs, modules, or applications;

online personal banking systems, packages, programs, modules, or applications;

computing system implemented personal accounting systems, packages, programs, modules, or applications; and online personal accounting systems, packages, programs, modules, or applications; and at least one of the two or more types of financial management systems is selected from the group of business financial management systems consisting of:

computing system implemented business financial management systems, packages, programs, modules, or applications;

online business financial management systems, packages, programs, modules, or applications;

computing system implemented business commercial transaction management systems, packages, programs, modules, or applications;

online business commercial transaction management systems, packages, programs, modules, or applications;

computing system implemented business tax preparation systems, packages, programs, modules, or applications;

online business tax preparation systems, packages, programs, modules, or applications;

computing system implemented business banking systems, packages, programs, modules, or applications;

online business banking systems, packages, programs, modules, or applications;

computing system implemented invoicing, packages, programs, modules, or applications;

online invoicing, packages, programs, modules, or applications;

computing system implemented business accounting systems, packages, programs, modules, or applications; and online business accounting systems, packages, programs, modules, or applications.

13. The system for identifying entities and obtaining financial profile data for the entities using de-duplicated data from the two or more types of financial management systems of claim 10 wherein at least one of the one or more attributes associated with the potential entities is selected from the group of attributes consisting of:

one or more names associated with an individual entity; one or more names associated with a business entity; one or more addresses associated with an individual entity;

one or more addresses associated with a business entity; one or more geo-locations associated with an individual entity;

one or more geo-locations associated with a business entity;
one or more phone numbers associated with an individual entity;
one or more phone numbers associated with a business entity;
one or more E-mail addresses associated with an individual entity;
one or more E-mail addresses associated with a business entity;
one or more website addresses associated with an individual entity;
one or more website addresses associated with a business entity;
one or more industries, markets, or areas of endeavor associated with an individual entity;
one or more industries, markets, or areas of endeavor associated with a business entity; and
any combination thereof.

14. The system for identifying entities and obtaining financial profile data for the entities using de-duplicated data from the two or more types of financial management systems of claim 10 wherein the commercial transaction data in the master commercial transaction list includes commercial transaction data representing payments made by, and/or payments received by, one or more entities in the master entity list.

15. The system for identifying entities and obtaining financial profile data for the entities using de-duplicated data from the two or more types of financial management systems of claim 10 wherein the commercial transaction data in the master commercial transaction list includes commercial transaction data representing invoices sent by and/or invoices received by one or more entities in the master entity list.

16. The system for identifying entities and obtaining financial profile data for the entities using de-duplicated data from the two or more types of financial management systems of claim 10 wherein the commercial transaction data in the master commercial transaction list includes commercial transaction data representing project estimates sent by and/or project estimates received by one or more entities in the master entity list.

17. The system for identifying entities and obtaining financial profile data for the entities using de-duplicated data from the two or more types of financial management systems of claim 10 wherein the master entity list and the master commercial transaction list are used to generate a financial profile for one or more of the entities listed in the master entity list by, for each entity in the master entity list, aggregating all commercial transaction data in the master commercial transaction list associated with the entity.

18. The system for identifying entities and obtaining financial profile data for the entities using de-duplicated data from the two or more types of financial management systems of claim 10 wherein the master entity list and the master commercial transaction list are used to generate a financial profile for one or more of the entities listed in the master entity list by, for each entity in the master entity list, aggregating all commercial transaction data in the master commercial transaction list associated with the entity and processing the aggregated commercial transaction data using one or more analysis parameters.

19. A system for identifying entities and obtaining financial profile data for the entities using de-duplicated data from two or more types of financial management systems comprising:
at least one processor; and
at least one memory coupled to the at least one processor, the at least one memory having stored therein instructions which when executed by any set of the one or more processors, perform a process for dynamically identifying and suggesting geographically related appointments, the process for dynamically identifying and suggesting geographically related appointments including:
obtaining financial data from the two or more types of financial management systems;
analyzing the financial data to obtain initial potential entities data identifying one or more initial potential entities and one or more entity attributes associated with each initial potential entity of the initial potential entities;
obtaining external reference entities data from a third party source identifying one or more external reference entities and one or more entity attributes associated with each of the external reference entities;
analyzing the initial potential entities data and the external reference entities data to identify initial potential entities in the potential entities data having one or more entity attributes that match, to at least a threshold degree, entity attributes associated with an external reference entity;
designating each initial potential entity of the initial potential entities having one or more entity attributes that match, to at least a threshold degree, entity attributes associated with an external reference entity as duplicate entities with respect to the matched external reference entity and replacing the designated duplicate entities in the initial potential entities data with the matched external reference entity to generate revised potential entities data identifying one or more revised potential entities and one or more entity attributes associated with each of the revised potential entities;
comparing data representing each revised potential entity of the revised potential entities in the revised potential entities data with data representing all of the other revised potential entities in the revised potential entities data to identify revised potential entities that have one or more entity attributes that match, to at least a threshold degree;
designating each revised potential entity of the revised potential entities in the revised potential entities data having one or more entity attributes that match, to at least a threshold degree, as duplicate entities with respect to each other;
selecting one of the duplicate entities as the revised potential entity and eliminating all the other identified duplicate entities in the revised potential entities data; and
designating all the remaining revised potential entities as identified entities in the revised potential entities data to transform the revised potential entities data into a master entity list including data indicating the identified entities and their respective attributes data;
analyzing the financial data to identify potential commercial transaction data and one or more attributes associated with the commercial transaction data, including data indicating commercial transactions and parties associated with the commercial transactions;
arranging the identified potential commercial transaction data in a list of potential commercial transaction data;
analyzing the list of potential commercial transaction data to identify duplicate potential commercial transaction data entries;
eliminating the identified duplicate potential commercial transaction data entries to transform the list of potential commercial transaction data into a commercial transaction list including data indicating commercial transactions and the parties associated with the commercial transactions;

analyzing the commercial transaction list and the master entity list to match one or more entities listed in the master entity list with the parties associated with the commercial transactions in the commercial transaction list;

substituting the matched entities listed in the master entity list for respectively matched parties associated with the commercial transactions in the commercial transaction list to create a master commercial transaction list; and storing data representing the master entity list and the master commercial transaction list.

* * * * *